(12) United States Patent
Lao et al.

(10) Patent No.: US 7,031,994 B2
(45) Date of Patent: Apr. 18, 2006

(54) MATRIX TRANSPOSITION IN A COMPUTER SYSTEM

(75) Inventors: Shandong Lao, Erie, CO (US);
Bradley Romain Lewis, Broomfield, CO (US); Michael Lee Boucher, Broomfield, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 600 days.

(21) Appl. No.: 10/218,312

(22) Filed: Aug. 13, 2002

(65) Prior Publication Data

US 2003/0088600 A1 May 8, 2003

Related U.S. Application Data

(60) Provisional application No. 60/312,201, filed on Aug. 13, 2001.

(51) Int. Cl.
*G06F 7/00* (2006.01)
*G06F 17/14* (2006.01)

(52) U.S. Cl. .................. 708/400; 708/401; 712/10
(58) Field of Classification Search ............... 708/400, 708/401; 712/10
See application file for complete search history.

(56) References Cited

U.S. PATENT DOCUMENTS

| | | | | |
|---|---|---|---|---|
| 4,918,527 A | * | 4/1990 | Penard et al. | 348/718 |
| 5,805,476 A | * | 9/1998 | Kim et al. | 708/200 |
| 5,875,355 A | * | 2/1999 | Sidwell et al. | 712/300 |
| 6,021,420 A | * | 2/2000 | Takamuki | 708/401 |
| 6,544,517 B1 | * | 4/2003 | Rikihisa et al. | 424/184.1 |
| 6,625,721 B1 | * | 9/2003 | Chen | 712/10 |
| 6,877,020 B1 | * | 4/2005 | Bratt et al. | 708/400 |

OTHER PUBLICATIONS

Cate, Esko G. et al., "Algorithm 513, Analysis of In-Situ Transposition [F1]", *ACM Transactions on Mathematical Software*, vol. 3, No. 1, pp. 104-110 (Mar. 1977).

* cited by examiner

*Primary Examiner*—D. H. Malzahn
(74) *Attorney, Agent, or Firm*—Gunnison, McKay & Hodgson, L.L.P.

(57) ABSTRACT

Improved transposition of a matrix in a computer system may be accomplished while utilizing at most a single permutation vector. This greatly improves the speed and parallelability of the transpose operation. For a standard rectangular matrix having M rows and N columns and a size M×N, first n and q are determined, wherein N=n*q, and wherein M×q represents a block size and wherein N is evenly divisible by p. Then, the matrix is partitioned into n columns of size M×q. Then for each column n, elements are sequentially read within the column row-wise and sequentially written into a cache, then sequentially read from the cache and sequentially written row-wise back into the matrix in a memory in a column of size q×M. A permutation vector may then be applied to the matrix to arrive at the transpose. This method may be modified for special cases, such as square matrices, to further improve efficiency.

39 Claims, 10 Drawing Sheets

MATRIX TRANSPOSITION IN A COMPUTER SYSTEM

CROSS REFERENCE TO RELATED APPLICATIONS

This application claims the benefit of provisional patent application Ser. No. 60/312,201 filed Aug. 13, 2001 in the name of inventors Shandong Lao, Brad R. Lewis, and Michael Boucher and entitled "Matrix Transposition".

FIELD OF THE INVENTION

The present invention relates to the field of computer science. More particularly, the present invention relates to a software program for transposing a matrix in a computer system.

BACKGROUND OF THE INVENTION

Matrices are utilized in many different computing processes. There are a number of different operations that may be applied to a matrix. One of the most important operations is the transpose operation. In the transpose operation, the rows and columns of an input matrix are reversed. In formal terms, if A is any matrix whose (i,j)-entry is $a_{ij}$, the transpose of A (denoted $A^T$) is the matrix whose (i, j)-entry is $a_{ji}$, the matrix obtained by reflecting in the main diagonal. This new matrix may then be denoted B. Thus if the original matrix A had M rows and N columns (i.e. $A_{M \times N}$) then the transpose operation results in $B_{N \times M}$.

For example:

$$\begin{bmatrix} 0 & 2 & 4 \\ 1 & 3 & 5 \end{bmatrix}^T = \begin{bmatrix} 0 & 1 \\ 2 & 3 \\ 4 & 5 \end{bmatrix}$$

The transpose operation is used frequently in remote-sensing data processing, seismic data processing, signal processing, and image processing, as well as for data rearrangement for more efficient computation in other transformations and applications such as Fast Fourier Transform (FFT). If the application requires large data matrices, in-place transpose must be used as there is often not enough memory to hold both a large matrix and its transpose.

The transpose operation may be performed out-of-place and in-place in computers. In out-of-place transpose, the input and output matrices reside in two distinct memory locations. The input matrix is not changed and the result of the operation is placed in the output matrix. The output matrix has at least the size of the input matrix. This can be done by simply copying every element in input matrix to its reversed position in output matrix. The processing is trivial but inefficient. In-place transpose is much more complicated. In in-place transpose, the input and output matrices occupy the same memory location. A workspace, normally much smaller than the input matrix, may be required to be used as a cache to improve performance. While out-of-place transpose is faster than in-place transpose, it required more available memory. Thus, the determination of whether to use out-of-place or in-place transpose in a particular system is largely dependent upon which is more valuable in that system, time or space.

The in-place transpose operation for a square matrix, a matrix in which the number of rows equals the number of columns, may be accomplished by swapping the elements about the main diagonal. It should be pointed out that is a very inefficient approach. For a rectangular matrix, a method known as cyclic permutation may be utilized to do the in-place transpose.

Consider a 3×4 matrix:

$$A = \begin{bmatrix} 0 & 3 & 6 & 9 \\ 1 & 4 & 7 & 10 \\ 2 & 5 & 8 & 11 \end{bmatrix}$$

and its transpose:

$$A^T = \begin{bmatrix} 0 & 1 & 2 \\ 3 & 4 & 5 \\ 6 & 7 & 8 \\ 9 & 10 & 11 \end{bmatrix}$$

When stored in computer memory, the elements reside sequentially as:

$A_m = [0\ 1\ 2\ 3\ 4\ 5\ 6\ 7\ 8\ 9\ 10\ 11]$ and $A^T_m = [0\ 3\ 6\ 9\ 1\ 4\ 7\ 10\ 2\ 5\ 8\ 11]$ where m indicates the memory layout of the matrix. The value of each element also serves as the index of the element in the computer memory.

If one compares $A_m$ and $A^T_m$ it can be seen that the transpose may actually be performed by two cyclic permutations:

$(3 \leftarrow 9 \leftarrow 5 \leftarrow 4 \leftarrow 1 \leftarrow 3 \leftarrow)$ and $(8 \leftarrow 2 \leftarrow 6 \leftarrow 7 \leftarrow 10 \leftarrow 8 \leftarrow)$ where the arrows indicate the direction of the element movement in order to achieve the transformation. These permutation cycles are independent from each other. The first and last elements are not moved. The permutation cycles may be kept in a vector called the permutation vector. The permutation vector for the example above would be:

$(3\ 9\ 5\ 4\ 1\ 0\ 8\ 2\ 6\ 7\ 10\ 0\ 0)$ where a single 0 represents the termination of the permutation cycle and a double 0 indicates the termination of the permutation vector. This implementation, however, requires the checking of both the cycle terminator and the vector terminator for every element to be moved when the permutation is actually performed.

Representing the permutations as matrices is helpful in understanding the processing, even though at the computer level the matrices are represented as vectors.

$$A = \begin{bmatrix} 0 & 3 & 6 & 9 \\ 1 & 4 & 7 & 10 \\ 2 & 5 & 8 & 11 \end{bmatrix} \xrightarrow{\text{First Permutation}} \begin{bmatrix} 0 & 9 & 6 & 5 \\ 3 & 1 & 7 & 10 \\ 2 & 4 & 8 & 11 \end{bmatrix} \xrightarrow{\text{Second Permutation}}$$

-continued $$= \begin{bmatrix} 0 & 9 & \underline{7} & 5 \\ 3 & 1 & \underline{10} & 8 \\ \underline{6} & 4 & \underline{2} & 11 \end{bmatrix}$$

$$= \begin{bmatrix} 0 & 1 & 2 \\ 3 & 4 & 5 \\ 6 & 7 & 8 \\ 9 & 10 & 11 \end{bmatrix}$$

$$= A^T$$

where underlined elements are those moved during the permutations. The notation $V_{M,N}$ may be used for a permutation vector used to transpose an M×N matrix.

However, applying a permutation vector in the computing realm is not a trivial matter. Simply applying a permutation vector on a large matrix is very expensive. A much better method, a four-step method, can be used. This method is best described using the following example.

Consider a 6×4 matrix:

$$A = \begin{bmatrix} 0 & 6 & 12 & 18 \\ 1 & 7 & 13 & 19 \\ 2 & 8 & 14 & 20 \\ 3 & 9 & 15 & 21 \\ 4 & 10 & 16 & 22 \\ 5 & 11 & 17 & 23 \end{bmatrix}$$

This matrix can be partitioned into a 3×2 matrix of submatrices of size 2×2

$$A = \begin{bmatrix} \begin{bmatrix} 0 & 6 \\ 1 & 7 \end{bmatrix} & \begin{bmatrix} 12 & 18 \\ 13 & 19 \end{bmatrix} \\ \begin{bmatrix} 2 & 8 \\ 3 & 9 \end{bmatrix} & \begin{bmatrix} 14 & 20 \\ 15 & 21 \end{bmatrix} \\ \begin{bmatrix} 4 & 10 \\ 5 & 11 \end{bmatrix} & \begin{bmatrix} 16 & 22 \\ 17 & 23 \end{bmatrix} \end{bmatrix}$$

In step 1, the partitioned matrix A may be treated as two 3×2 submatrices of vectors of length 2, with 6 vectors per submatrix:

$$A = \begin{bmatrix} \begin{bmatrix} \langle {0 \atop 1} \rangle & \langle {6 \atop 7} \rangle \\ \langle {2 \atop 3} \rangle & \langle {8 \atop 9} \rangle \\ \langle {4 \atop 5} \rangle & \langle {10 \atop 11} \rangle \end{bmatrix} & \begin{bmatrix} \langle {12 \atop 13} \rangle & \langle {18 \atop 19} \rangle \\ \langle {14 \atop 15} \rangle & \langle {20 \atop 21} \rangle \\ \langle {16 \atop 17} \rangle & \langle {22 \atop 23} \rangle \end{bmatrix} \end{bmatrix}$$

Then each of the two submatrices is transposed by permutation using the termination vector (the terminators are omitted in this example to improve readability):

$$V_{3,2} = (3\ 4\ 2\ 1)$$

to get:

$$A \Rightarrow \begin{bmatrix} \begin{bmatrix} \langle {0 \atop 1} \rangle & \langle {8 \atop 9} \rangle \\ \langle {6 \atop 7} \rangle & \langle {4 \atop 5} \rangle \\ \langle {2 \atop 3} \rangle & \langle {10 \atop 11} \rangle \end{bmatrix} & \begin{bmatrix} \langle {12 \atop 13} \rangle & \langle {20 \atop 21} \rangle \\ \langle {18 \atop 19} \rangle & \langle {16 \atop 17} \rangle \\ \langle {14 \atop 15} \rangle & \langle {22 \atop 23} \rangle \end{bmatrix} \end{bmatrix} = A_1$$

In step 2, $A_1$ is treated as a 1×6 matrix of submatrices of size 2×2:

$$A_1 = \begin{bmatrix} \begin{bmatrix} 0 & 6 \\ 1 & 7 \end{bmatrix} & \begin{bmatrix} 2 & 8 \\ 3 & 9 \end{bmatrix} & \begin{bmatrix} 4 & 10 \\ 5 & 11 \end{bmatrix} & \begin{bmatrix} 12 & 18 \\ 13 & 19 \end{bmatrix} & \begin{bmatrix} 14 & 20 \\ 15 & 21 \end{bmatrix} & \begin{bmatrix} 16 & 22 \\ 17 & 23 \end{bmatrix} \end{bmatrix}$$

Permutations using the permutation vector:

$$V_{2,2} = (2\ 1)$$

may then performed on each of the submatrices to get:

$$A_1 \Rightarrow \begin{bmatrix} \begin{bmatrix} 0 & 1 \\ 6 & 7 \end{bmatrix} & \begin{bmatrix} 2 & 3 \\ 8 & 9 \end{bmatrix} & \begin{bmatrix} 4 & 5 \\ 10 & 11 \end{bmatrix} & \begin{bmatrix} 12 & 13 \\ 18 & 19 \end{bmatrix} & \begin{bmatrix} 14 & 15 \\ 20 & 21 \end{bmatrix} & \begin{bmatrix} 16 & 17 \\ 22 & 23 \end{bmatrix} \end{bmatrix}$$

$$= A_2$$

$A_2$ may then be thought of as a 3×2 matrix of submatrices of size 2×2. A permutation using the permutation vector:

$$V_{3,2} = (3\ 4\ 2\ 1)$$

may then be performed on the matrix to get:

$$A_2 \Rightarrow \begin{bmatrix} \begin{bmatrix} 0 & 1 \\ 6 & 7 \end{bmatrix} \begin{bmatrix} 12 & 13 \\ 18 & 19 \end{bmatrix} \begin{bmatrix} 2 & 3 \\ 8 & 9 \end{bmatrix} \begin{bmatrix} 14 & 18 \\ 20 & 21 \end{bmatrix} \begin{bmatrix} 4 & 8 \\ 10 & 11 \end{bmatrix} \begin{bmatrix} 16 & 17 \\ 22 & 23 \end{bmatrix} \end{bmatrix} = A_3$$

In step 4, $A_3$ is treated as three 2×2 submatrices of vectors of length 2:

$$A_3 = \begin{bmatrix} \begin{bmatrix} \langle {0 \atop 6} \rangle & \langle {12 \atop 18} \rangle \\ \langle {1 \atop 7} \rangle & \langle {13 \atop 19} \rangle \end{bmatrix} & \begin{bmatrix} \langle {2 \atop 8} \rangle & \langle {14 \atop 20} \rangle \\ \langle {3 \atop 9} \rangle & \langle {15 \atop 21} \rangle \end{bmatrix} & \begin{bmatrix} \langle {4 \atop 10} \rangle & \langle {16 \atop 22} \rangle \\ \langle {16 \atop 22} \rangle & \langle {17 \atop 23} \rangle \end{bmatrix} \end{bmatrix}$$

Each of the three submatrices is transposed by permutation using the permutation vector:

$$V_{2,2} = (2\ 1)$$

to finish the transpose processing:

$$A_3 \Rightarrow \begin{bmatrix} \begin{bmatrix} \langle {0 \atop 6} \rangle & \langle {1 \atop 7} \rangle \\ \langle {12 \atop 18} \rangle & \langle {13 \atop 19} \rangle \end{bmatrix} & \begin{bmatrix} \langle {2 \atop 8} \rangle & \langle {3 \atop 9} \rangle \\ \langle {14 \atop 20} \rangle & \langle {15 \atop 21} \rangle \end{bmatrix} & \begin{bmatrix} \langle {4 \atop 10} \rangle & \langle {5 \atop 11} \rangle \\ \langle {16 \atop 22} \rangle & \langle {17 \atop 23} \rangle \end{bmatrix} \end{bmatrix}$$

$$A = \begin{bmatrix} 0 & 1 & 2 & 3 & 4 & 5 \\ 6 & 7 & 8 & 9 & 10 & 11 \\ 12 & 13 & 14 & 15 & 16 & 17 \\ 18 & 19 & 20 & 21 & 22 & 23 \end{bmatrix}$$
$$= A^T$$

In this four step method, at least two permutation vectors have to be computed and four times of permutation processing using these two permutation vectors have to be perform on the matrix. A special case also exists where a simplified transposed method may be applied if the matrix is a square matrix. A square matrix $A_{N \times N}$ is partitioned into an n×n matrix of square submatrices $A_{ij}$ of p×p where N=n*p. That is:

$$A = \begin{bmatrix} A_{00} & A_{01} & \cdots & A_{0,n-1} \\ A_{10} & A_{11} & \cdots & A_{1,n-1} \\ \vdots & \vdots & \ddots & \vdots \\ A_{n-1,0} & A_{n-1,1} & \cdots & A_{n-1,n-1} \end{bmatrix}$$

then simply:

$$A^T = \begin{bmatrix} A_{00}^T & A_{10}^T & \cdots & A_{n-1,0}^T \\ A_{01}^T & A_{11}^T & \cdots & A_{n-1,1}^T \\ \vdots & \vdots & \ddots & \vdots \\ A_{0,n-1}^T & A_{1,n-1}^T & \cdots & A_{n-1,n-1}^T \end{bmatrix}$$

The transpose is accomplished by transposing each $A_{ij}$ and then swapping $A_{ij}$ and $A_{ji}$. This processing may be accomplished by copying column-wise $A_{ij}$ and $A_{ji}$ into a cache/workspace, respectively, and then reading row-wise from the cache/workspace and storing column-wise into their final destination.

Computing the permutation vector is a task accomplished via serial processing, and may take a significant amount of time depending on the size and shape of the matrix and the block size used to partition the matrix. As parallel computing grows in popularity, this delay becomes even more significant. The time spent in computing the permutation vectors may be longer than that spent on moving the elements. Thus, reducing the number of permutation vectors required to perform the transpose would make the operation much more efficient.

What is needed is a solution which reduces the number of permutation vectors required to perform a transpose of a matrix to allow for better parallel processing of transpose operations.

BRIEF DESCRIPTION OF THE INVENTION

Improved transposition of a matrix in a computer system may be accomplished while utilizing at most a single permutation vector. This greatly improves the speed and parallelability of the transpose operation. For a standard rectangular matrix having M rows and N columns and a size M×N, first n and q are determined, wherein N=n*q, and wherein M×q represents a block size and wherein N is evenly divisible by q. Then, the matrix is partitioned into n columns of size M×q. Then for each column n, elements are sequentially read within the column row-wise and sequentially written into a cache, then sequentially read from the cache and sequentially written row-wise back into the matrix in a memory in a column of size q×M. A permutation vector may then be applied to the matrix to arrive at the transpose. This method may be modified for special cases, such as square matrices, to further improve efficiency.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION OF ONE EMBODIMENT

Figure 1:
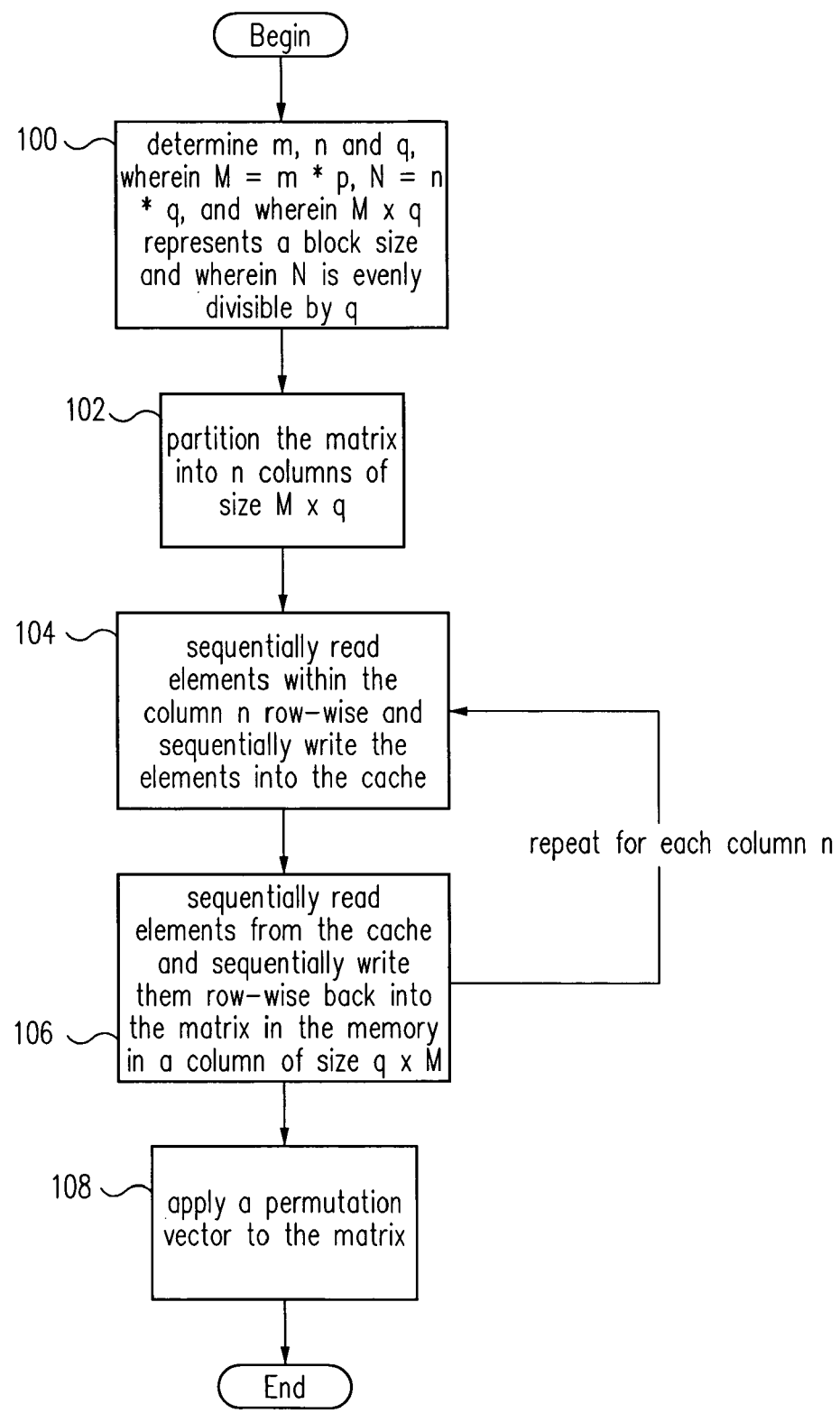
FIG. 1 is a flow diagram illustrating a method for transposing a matrix of numbers using a computer system, the computer system having a processor, a memory, and a cache, the matrix stored in the memory and having M rows and N columns and a size M×N in accordance with a specific embodiment of the present invention.
Figure 2:
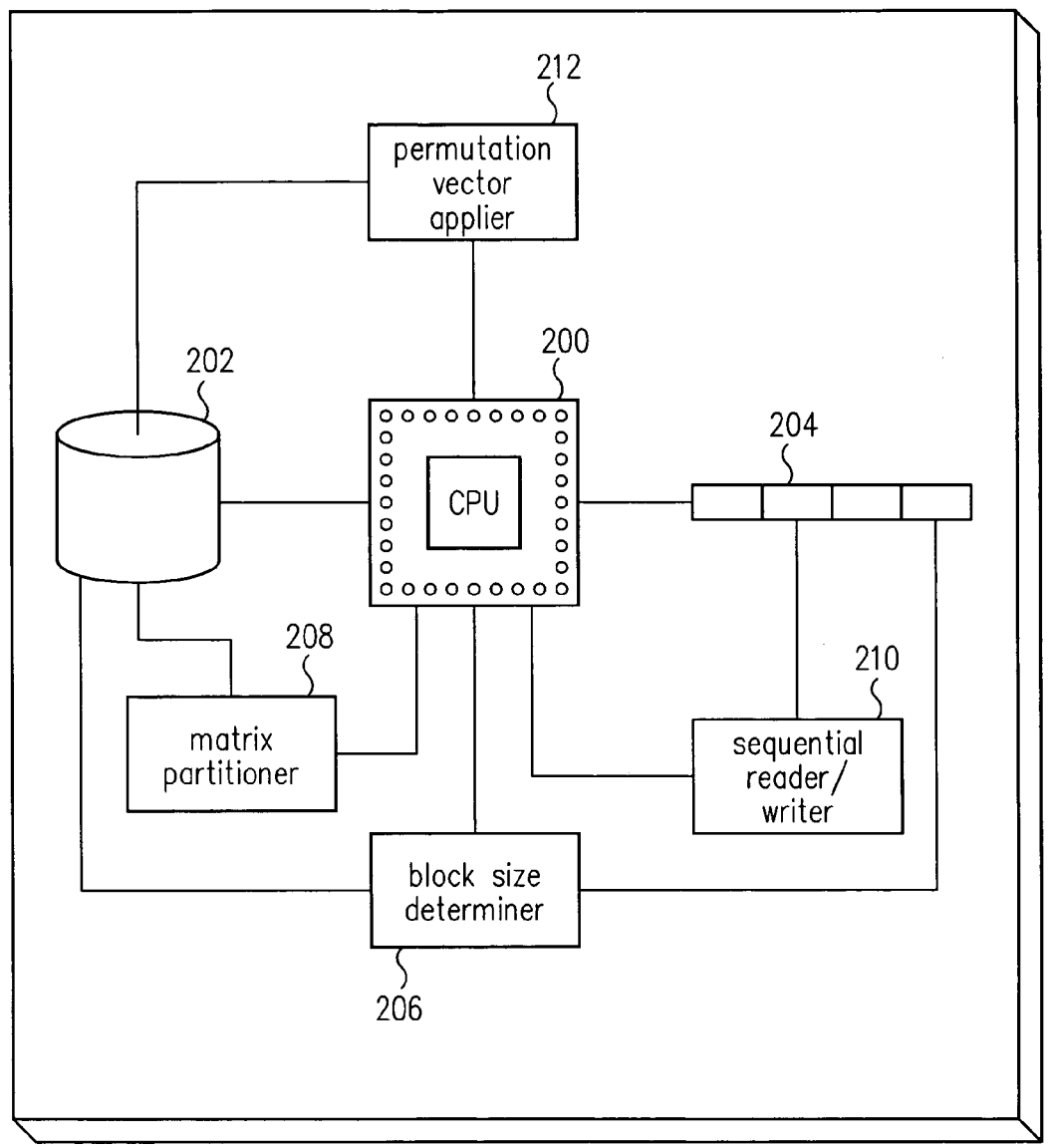
FIG. 2 is a block diagram illustrating a computer system for transposing a matrix of numbers, the matrix having M rows and N columns and a size M×N in accordance with a specific embodiment of the present invention.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The present invention permits a transpose operation to be performed while computing at most a single permutation vector. This allows for much faster processing during the transpose operation, and permits parallel computing to be accomplished much more efficiently.

The permutation in the prior art uses terminators included in the permutation vector to separate permutation cycles and stop the permutation processing. This implementation incurs a performance cost because it must check both the cycle terminator and the vector terminator for each element to be moved. The prior art also makes parallelizing the permutations inefficient and/or difficult.

In a specific embodiment of the present invention, an index vector is utilized to indicate the beginning and end of each permutation cycle. Using the example outlined in the background, the index vector and permutation vector are:

$I_{3,4} = (0\ 5\ 10)$ $V_{3,4} = (3\ 9\ 5\ 4\ 1\ 8\ 2\ 6\ 7\ 10)$

The numbers in the index vector are index pointers to the beginning of the permutation cycles. The ends of the permutation cycles may also be calculated from the indexes. The last element of the index vector is only used to determine the end of the last cycle. In a specific embodiment of the present invention, the permutation vector generator may be modified to generate both the index vector and the permutation vector without any performance penalty. This implementation greatly improves the permutation processing and makes it easier to parallelize the permutations.

Saving the generated permutation vector for reuse will also improve performance, as often the transpose operation is repeatedly called for the same matrix and/or its transpose. In accordance with a specific embodiment of the present invention, a linked list data structure may be utilized to keep the used permutation vectors. A newly generated permutation vector is added to the list at the most recent node. Whenever a new permutation vector is needed, the total space utilized by the linked list may be checked before the permutation vector is generated. If it exceeds a maximum size amount, the least recent node may be removed from the list (unless it is identical to the newly generated permutation vector). The checking and deletion may be repeated until enough space is released for the new vector.

The same permutation vector may be utilized in the transpose operation of both an M×N matrix and an N×M matrix by carrying out the permutation in the opposite direction for each cycle. Therefore, when a permutation is required to transpose an M×N matrix, a search is performed through the linked list for not only the vector generated for the M×N matrix but also for the N×M matrix.

An optimal block size is the largest block size that keeps cache misses at a minimum. Therefore, the guide for partitioning a matrix is to use large contiguous blocks but make them small enough to fit in the cache. Blocks selected under this guide will take maximum advantage of the cache. In a specific embodiment of the present invention, the block size chosen will be the largest block size that fits into the cache. Thus, an M×N matrix may be partitioned into n blocks (columns) of size M×q instead of m*n blocks of size p×q, where M=m*p and N=n*q. For example:

$$A = \begin{bmatrix} 0 & 4 & 8 & 12 & 16 & 20 \\ 1 & 5 & 9 & 13 & 17 & 21 \\ 2 & 6 & 10 & 14 & 18 & 22 \\ 3 & 7 & 11 & 15 & 19 & 23 \end{bmatrix}$$

$$\underline{\underline{partition}} \begin{bmatrix} \begin{bmatrix} 0 & 4 \\ 1 & 5 \\ 2 & 6 \\ 3 & 7 \end{bmatrix} \begin{bmatrix} 8 & 12 \\ 9 & 13 \\ 10 & 14 \\ 11 & 15 \end{bmatrix} \begin{bmatrix} 16 & 20 \\ 17 & 21 \\ 18 & 22 \\ 19 & 23 \end{bmatrix} \end{bmatrix}$$

For the same block size, this column block implementation incurs fewer cache misses. Partition along a single dimension is also easier and less restrictive than along two dimensions. This partition implementation also allows a two-step process for in-place transpose. Additionally, a more efficient out-of-place transpose may be based from this partition implementation.

Combining the two-step in-place transpose with dataflow techniques allows significant improvement in parallelability, and thus significant improvement in load balancing and scalability, as well as a reduction in the number of data moves. Additionally, the reduction in steps from four to two allows only one permutation vector to be required.

In a specific embodiment of the present invention, dataflow techniques may be implemented using a dataflow application program interface (API), which may aid in the manipulation of data dependencies. The parallelism may be well controlled using this tool. A problem may be divided into pieces of tasks and the tasks placed in priority queues. Thus, in a specific embodiment of the present invention, the two steps are partitioned into many tasks and placed into priority queues. The first step's tasks have higher priority than the second. The permutation vector search and computation may be given the highest priority. This allows the parallel transpose to run with excellent load balancing and scalability.

For efficient out-of-place transposing of a matrix $A_{M \times N}$ into $B_{M \times N}$, the column block partition outlined above may be utilized. Each M×q column of A is copied into the q×M row of B. The copy is accomplished by reading row-wise from A then writing column-wise into B. For example:

$$A_{3 \times 4} = \begin{bmatrix} 0 & 3 & 6 & 9 \\ 1 & 4 & 7 & 10 \\ 2 & 5 & 8 & 11 \end{bmatrix} \stackrel{partition}{=} \begin{bmatrix} \begin{bmatrix} 0 & 3 \\ 1 & 4 \\ 2 & 5 \end{bmatrix} & \begin{bmatrix} 6 & 9 \\ 7 & 10 \\ 8 & 11 \end{bmatrix} \end{bmatrix} \stackrel{first}{\Longrightarrow}_{copy}$$

$$\begin{bmatrix} 0 & 1 & 2 \\ 3 & 4 & 5 \\ x & x & x \\ x & x & x \end{bmatrix} \stackrel{second}{\underset{copy}{\Longrightarrow}} \begin{bmatrix} 0 & 1 & 2 \\ 3 & 4 & 5 \\ 6 & 7 & 8 \\ 9 & 10 & 11 \end{bmatrix}$$

$$= B_{4 \times 3}$$

The two-step transpose may be accomplished as follows. In step 1, matrix $A_{m \times n}$ is partitioned into n columns of size M×q, where N=n*q. Each column may be transposed by permutation. However, because the columns are contiguous and chosen to be able to fit in the cache, the transpose may be accomplished in an alternative and more efficient way. In order to transpose the columns efficiently, a workspace of the same size as a column is allocated. The transpose of a column is carried out by copying the whole column into the workspace sequentially, then copying back into its original spot with its elements transposed. The copying back is a process of reading row-wise and then writing column-wise. For example:

$$A = \begin{bmatrix} 0 & 3 & 6 & 9 \\ 1 & 4 & 7 & 19 \\ 2 & 5 & 8 & 11 \end{bmatrix} \stackrel{partition}{=} \begin{bmatrix} \begin{bmatrix} 0 & 3 \\ 1 & 4 \\ 2 & 5 \end{bmatrix} & \begin{bmatrix} 6 & 9 \\ 7 & 10 \\ 8 & 11 \end{bmatrix} \end{bmatrix} \stackrel{first}{\underset{transpose}{\Longrightarrow}}$$

$$\begin{bmatrix} \begin{bmatrix} 0 & 1 & 2 \\ 3 & 4 & 5 \end{bmatrix} & \begin{bmatrix} 6 & 9 \\ 7 & 10 \\ 8 & 11 \end{bmatrix} \end{bmatrix} \stackrel{second}{\underset{transpose}{\Longrightarrow}} \begin{bmatrix} \begin{bmatrix} 0 & 1 & 2 \\ 3 & 4 & 5 \end{bmatrix} & \begin{bmatrix} 6 & 7 & 8 \\ 9 & 10 & 11 \end{bmatrix} \end{bmatrix}$$

$$= A_1$$

In step 2, the result matrix from step 1 is treated as an M×n matrix of vectors of length q. A permutation vector for the M×n matrix is used to perform permutation transpose over the vector matrix to get $A^T$. Continuing the above example, step 2 involves:

$$A_1 = \begin{bmatrix} \binom{0}{3} & \binom{6}{9} \\ \binom{1}{4} & \binom{7}{10} \\ \binom{2}{5} & \binom{8}{11} \end{bmatrix} \stackrel{permutation}{\underset{transpose}{\Longrightarrow}} \begin{bmatrix} \binom{0}{3} & \binom{1}{4} & \binom{2}{5} \\ \binom{6}{9} & \binom{7}{10} & \binom{8}{11} \end{bmatrix}$$

$$= \begin{bmatrix} 0 & 1 & 2 \\ 3 & 4 & 5 \\ 6 & 7 & 8 \\ 9 & 10 & 11 \end{bmatrix}$$

$$= A^T$$

The permutation vector used is $V_{3,2}=(3\ 4\ 2\ 1)$.

FIG. 1 is a flow diagram illustrating a method for transposing a matrix of numbers using a computer system, the computer system having a processor, a memory, and a cache, the matrix stored in the memory and having M rows and N columns and a size M×N in accordance with a specific embodiment of the present invention. At 100, n and q are determined, wherein N=n*q, and wherein M×q represents a block size and wherein N is evenly divisible by q. In one embodiment of the present invention, the block size may be chosen such that it is the largest size that fits into the cache while still fulfilling the other parameters listed above. However, it is possible to alter the way the block size is chosen for particular types of matrices should experimentation find that another method is optimal in the system. At 102, the matrix is partitioned into n columns of size M×q. Then, for each column n, 104 and 106 are performed. At 104, the elements within the column n are sequentially read row-wise and the elements are sequentially written into the cache. At 106, the elements are then sequentially read from the cache and written back into the matrix in the memory in a column of size q×M.

Once this is done for each of the columns, at 108 a permutation vector may be applied to the matrix. The permutation vector contains two or more elements making up one or more permutation cycles. An index vector contains an element corresponding to each of the permutation cycles, each of the elements in the index vector indicating a starting position in the permutation vector for the corresponding permutation cycle. Each element within a permutation cycle corresponds to a block or element within the matrix, and the applying of the permutation vector includes moving the corresponding block or element for each element within the permutation cycle to a location indicated by the previous element within the permutation cycle. The permutation vector may be determined by searching through a list of permutation vectors to $$\stackrel{partition}{=} \begin{bmatrix} \begin{pmatrix} 0 & 6 & 12 & 18 & 24 & 30 \\ 1 & 7 & 13 & 19 & 25 & 31 \end{pmatrix} \\ \begin{pmatrix} 2 & 8 \\ 3 & 9 \end{pmatrix} \begin{pmatrix} 14 & 20 \\ 15 & 21 \end{pmatrix} \begin{pmatrix} 26 & 32 \\ 27 & 33 \end{pmatrix} \\ \begin{pmatrix} 4 & 10 \\ 5 & 11 \end{pmatrix} \begin{pmatrix} 16 & 22 \\ 17 & 23 \end{pmatrix} \begin{pmatrix} 28 & 34 \\ 29 & 35 \end{pmatrix} \end{bmatrix}$$

The first partition (band) is then copied into workspace W:

$$W = \begin{pmatrix} 0 & 6 & 12 & 18 & 24 & 30 \\ 1 & 7 & 13 & 19 & 25 & 31 \end{pmatrix}$$

Then the first column is transposed into its mirror position about the main diagonal. The operation is equivalent to a copy of a column to a band in out-of-place transpose discussed above. Its result is:

$$A \xrightarrow[\text{transpose}]{\text{out-of-place}} \begin{bmatrix} \begin{pmatrix} 0 & 6 \\ 1 & 7 \end{pmatrix} & \begin{matrix} \underline{2} & \underline{3} \\ \underline{8} & \underline{9} \end{matrix} & \begin{matrix} \underline{4} & \underline{5} \\ \underline{10} & \underline{11} \end{matrix} \\ \begin{pmatrix} 2 & 8 \\ 3 & 9 \end{pmatrix} & \begin{pmatrix} 14 & 20 \\ 15 & 21 \end{pmatrix} & \begin{pmatrix} 26 & 32 \\ 27 & 33 \end{pmatrix} \\ \begin{pmatrix} 4 & 10 \\ 5 & 11 \end{pmatrix} & \begin{pmatrix} 16 & 22 \\ 17 & 23 \end{pmatrix} & \begin{pmatrix} 28 & 34 \\ 29 & 35 \end{pmatrix} \end{bmatrix} = A_1$$

where the underlined elements are those changed. Then the elements stored in the workspace are copied back to get:

$$A_1 \xrightarrow[\text{transpose}]{\text{copy}} \begin{bmatrix} \underline{0} & \underline{1} & 2 & 3 & 4 & 5 \\ \underline{6} & \underline{7} & 8 & 9 & 10 & 11 \\ \underline{12} & \underline{13} & \begin{pmatrix} 14 & 20 \\ 15 & 21 \end{pmatrix} & \begin{pmatrix} 26 & 32 \\ 27 & 33 \end{pmatrix} \\ \underline{18} & \underline{19} & & & \\ \underline{24} & \underline{25} & \begin{pmatrix} 16 & 22 \\ 17 & 23 \end{pmatrix} & \begin{pmatrix} 28 & 34 \\ 29 & 35 \end{pmatrix} \\ \underline{30} & \underline{31} & & & \end{bmatrix} = A_2$$

This is exactly the copy transpose in the first step in general in-place transpose discussed above.

This process is repeated for the second column to get:

$$W = \begin{pmatrix} 14 & 20 & 26 & 32 \\ 15 & 21 & 27 & 33 \end{pmatrix}$$

$$A_2 \xrightarrow[\text{transpose}]{\text{out-of-place}} \begin{bmatrix} 0 & 1 & 2 & 3 & 4 & 5 \\ 6 & 7 & 8 & 9 & 10 & 11 \\ 12 & 13 & \begin{pmatrix} 14 & 20 \\ 15 & 21 \end{pmatrix} & \begin{matrix} \underline{16} & \underline{17} \\ \underline{22} & \underline{23} \end{matrix} \\ 18 & 19 & & & \\ 24 & 25 & \begin{pmatrix} 16 & 22 \\ 17 & 23 \end{pmatrix} & \begin{pmatrix} 28 & 34 \\ 29 & 35 \end{pmatrix} \\ 30 & 31 & & & \end{bmatrix} \xrightarrow[\text{transpose}]{\text{copy}}$$

$$\begin{bmatrix} 0 & 1 & 2 & 3 & 4 & 5 \\ 6 & 7 & 8 & 9 & 10 & 11 \\ 12 & 13 & \underline{14} & \underline{15} & 16 & 17 \\ 18 & 19 & \underline{20} & \underline{21} & 22 & 23 \\ 24 & 25 & \underline{26} & \underline{27} & \begin{pmatrix} 28 & 34 \\ 29 & 35 \end{pmatrix} \\ 30 & 31 & \underline{32} & \underline{33} & & \end{bmatrix} = A_3$$

The left block is copied to the workspace:

$$W = \begin{pmatrix} 28 & 34 \\ 29 & 35 \end{pmatrix}$$

then copied back in transpose to get the final result:

$$A_3 \xrightarrow[\text{transpose}]{\text{copy}} \begin{bmatrix} 0 & 1 & 2 & 3 & 4 & 5 \\ 6 & 7 & 8 & 9 & 10 & 11 \\ 12 & 13 & 14 & 15 & 16 & 17 \\ 18 & 19 & 20 & 21 & 22 & 23 \\ 24 & 25 & 26 & 27 & \underline{28} & \underline{29} \\ 30 & 31 & 32 & 33 & \underline{34} & \underline{35} \end{bmatrix} = A^T$$

Figure 3:
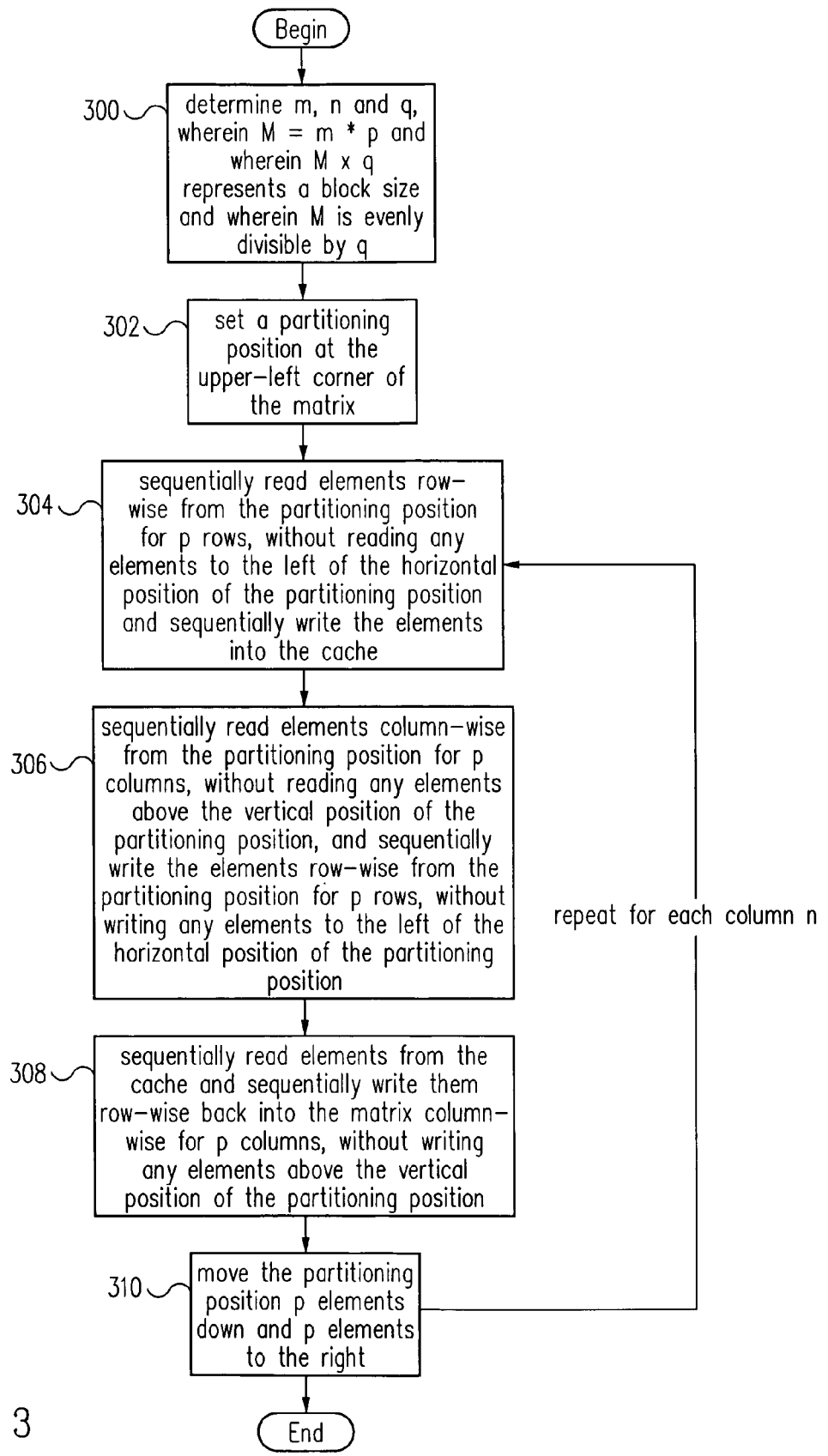
FIG. 3 is a flow diagram illustrating a method for transposing a square matrix of numbers using a computer system, the computer system having a processor, a memory, and a cache, the matrix stored in the memory and having M rows and M columns and a size M×M in accordance with a specific embodiment of the present invention.

FIG. 3 is a flow diagram illustrating a method for transposing a square matrix of numbers using a computer system, the computer system having a processor, a memory, and a cache, the matrix stored in the memory and having M rows and M columns and a size M×M in accordance with a specific embodiment of the present invention. At 300, m and p are determined, wherein M=m*p and wherein M×p represents a block size and wherein M is evenly divisible by p. In one embodiment of the present invention, the block size may be chosen such that it is the largest size that fits into the cache while still fulfilling the other parameters listed above. However, it is possible to alter the way the block size is chosen for particular types of matrices should experiments find that another method is optimal in the system. At 302, a partitioning position is set at the upper-left corner of the matrix. The partitioning position may have a horizontal position and a vertical position.

Then, for each column of size p, 304–310 are performed. At 304, elements are sequentially read row-wise from the partitioning position for p rows, without reading any elements to the left of the horizontal position of the partitioning position and the elements are sequentially written into the cache. At 306, elements are sequentially read column-wise from the partitioning position for p columns, without reading any elements above the vertical position of the partitioning position, and the elements are sequentially written row-wise from the partitioning position for p rows, without writing any elements to the left of the horizontal position of the partitioning position. At 308, elements are sequentially read from the cache and sequentially written row-wise back into the matrix column-wise for p columns, without writing any elements above the vertical position of the partitioning position. Finally, at 310, the partitioning position is moved p elements down and p elements to the right (which is also one column-block to the down and one-column block to the right, or one-column block further along the main diagonal).

Figure 4:
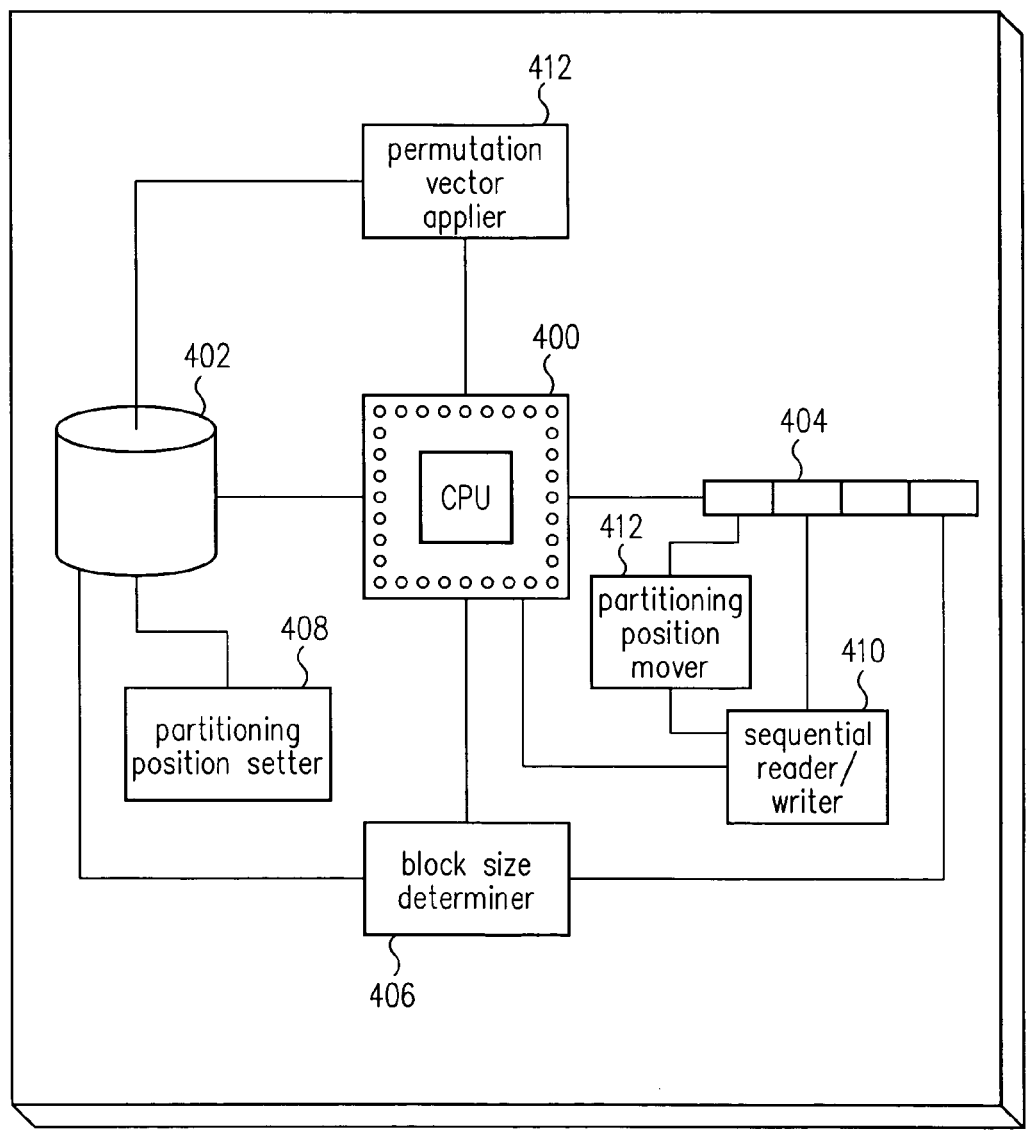
FIG. 4 is a block diagram illustrating a computer system for transposing a square matrix of numbers, the matrix having M rows and M columns and a size M×M in accordance with a specific embodiment of the present invention.

FIG. 4 is a block diagram illustrating a computer system for transposing a square matrix of numbers, the matrix having M rows and M columns and a size M×M in accordance with a specific embodiment of the present invention. A processor 400 is coupled to a memory 402. The matrix is stored in the memory 402. Additionally, a cache 404 is coupled to the processor 400. A block size determiner 406 coupled to the processor 400, the memory 402, and the cache, determines m and p, wherein M=m*p and wherein M×p represents a block size and wherein M is evenly divisible by p. In one embodiment of the present invention, the block size may be chosen such that it is the largest size that fits into the cache while still fulfilling the other parameters listed above. However, it is possible to alter the way the block size is chosen for particular types of matrices should experiments find that another method is optimal in the system. A partitioning position setter 408 coupled to the memory 402 sets a partitioning position at the upper-left corner of the matrix. The partitioning position may have a horizontal position and a vertical position.

Then, for each column of size p, elements 410 and 412 perform several tasks. A sequential reader/writer 410 coupled to the cache 404 and the processor 400 sequentially reads elements row-wise from the partitioning position for p rows, without reading any elements to the left of the horizontal position of the partitioning position and sequentially writes the elements into the cache. Then the sequential reader/writer 410 sequentially reads elements column-wise from the partitioning position for p columns, without reading any elements above the vertical position of the partitioning position, and the elements are written row-wise from the partitioning position for p rows, without writing any elements to the left of the horizontal position of the partitioning position. Then the sequential reader/writer 410 sequentially reads the elements from the cache and sequentially writes them row-wise back into the matrix column-wise for p columns, without writing any elements above the vertical position of the partitioning position. Finally, a partitioning position mover 412 coupled to the sequential reader/writer 410 and to the cache 404 moves the partitioning position p elements down and p elements to the right (which is also one column-block to the down and one-column block to the right, or one-column block further along the main diagonal).

If a rectangular matrix can be divided into square matrices in a way that the elements in each square matrix are stored in memory contiguously, the efficient square matrix transpose can be used to improve performance of the rectangular transpose. This may not get rid of permutation. However, it will reduce the number of permutation nodes significantly by increasing the length of the vectors to be moved.

A matrix with M rows and k*M columns, $A_{M*km}$ can be divided into k square matrixes of size M×M. In the first step, each of the k square matrices is transposed using the square transpose method introduced previously. In step 2, the result matrix from step 1 is treated as an M×k matrix of vectors of length M. Then a permutation transpose is performed over the matrix using a permutation vector $V_{M,k}$. For example:

$$A = \begin{bmatrix} 0 & 3 & 6 & 9 & 12 & 15 \\ 1 & 4 & 7 & 10 & 13 & 16 \\ 2 & 5 & 8 & 11 & 14 & 17 \end{bmatrix}$$

$$\overset{partition}{=} \begin{bmatrix} \begin{bmatrix} 0 & 3 & 6 \\ 1 & 4 & 7 \\ 2 & 3 & 8 \end{bmatrix} & \begin{bmatrix} 9 & 12 & 15 \\ 10 & 13 & 16 \\ 11 & 14 & 17 \end{bmatrix} \end{bmatrix} \overset{\text{first square}}{\Longrightarrow}$$

$$\begin{bmatrix} \begin{bmatrix} \underline{0} & \underline{1} & \underline{2} \\ \underline{3} & \underline{4} & \underline{5} \\ \underline{6} & \underline{7} & \underline{8} \end{bmatrix} & \begin{bmatrix} 9 & 12 & 15 \\ 10 & 13 & 16 \\ 11 & 14 & 17 \end{bmatrix} \end{bmatrix} \overset{\text{second square}}{\Longrightarrow}$$

$$\begin{bmatrix} \begin{bmatrix} 0 & 1 & 2 \\ 3 & 4 & 5 \\ 6 & 7 & 8 \end{bmatrix} & \begin{bmatrix} \underline{9} & \underline{10} & \underline{11} \\ \underline{12} & \underline{13} & \underline{14} \\ \underline{15} & \underline{16} & \underline{17} \end{bmatrix} \end{bmatrix} \overset{\text{trated as}}{=} \begin{bmatrix} 0 & 9 \\ \langle 3 \rangle & \langle 12 \rangle \\ 6 & 15 \\ 1 & 10 \\ \langle 4 \rangle & \langle 13 \rangle \\ 7 & 16 \\ 2 & 11 \\ \langle 5 \rangle & \langle 14 \rangle \\ 8 & 17 \end{bmatrix} \overset{\text{permutation}}{\underset{\text{transpose}}{\Longrightarrow}}$$

-continued $$\begin{bmatrix} 0 & 1 & 2 \\ \langle 3 \rangle & \langle 4 \rangle & \langle 5 \rangle \\ 6 & 7 & 8 \\ 9 & 10 & 11 \\ \langle 12 \rangle & \langle 13 \rangle & \langle 14 \rangle \\ 15 & 16 & 17 \end{bmatrix}$$

$$= \begin{bmatrix} 0 & 1 & 2 \\ 3 & 4 & 5 \\ 6 & 7 & 8 \\ 9 & 10 & 11 \\ 12 & 13 & 14 \\ 15 & 16 & 17 \end{bmatrix} = A^T$$

where the permutation vector used in step 2 is:

$V_{3,2}=(3\ 4\ 2\ 1)$

Figure 5:
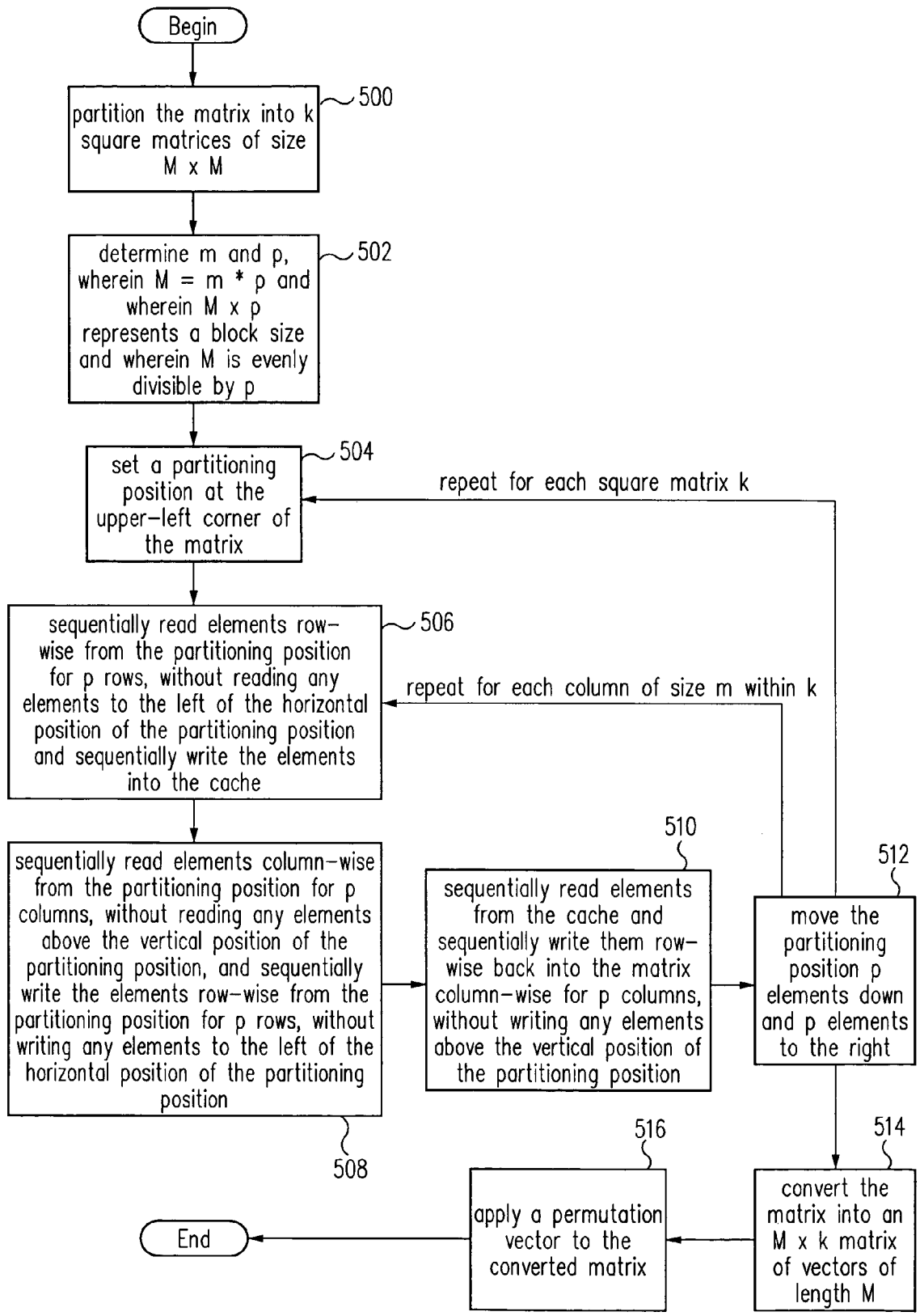
FIG. 5 is a flow diagram illustrating a method for transposing a matrix of numbers using a computer system, the computer system having a processor, a memory, and a cache, the matrix stored in the memory and having M rows and k*M columns and a size M×kM in accordance with a specific embodiment of the present invention.

FIG. 5 is a flow diagram illustrating a method for transposing a matrix of numbers using a computer system, the computer system having a processor, a memory, and a cache, the matrix stored in the memory and having M rows and k*M columns and a size M×kM in accordance with a specific embodiment of the present invention. At 500, the matrix is partitioned into k square matrices of size M×M. At 502, m and p are determined, wherein M=m*p and wherein M×p represents a block size and wherein M is evenly divisible by p. In one embodiment of the present invention, the block size may be chosen such that it is the largest size that fits into the cache while still fulfilling the other parameters listed above. However, it is possible to alter the way the block size is chosen for particular types of matrices should experiments find that another method is optimal in the system.

Then, for each of the k square matrices, 504–512 are performed. At 504, a partitioning position is set at the upper left-corner element of the matrix, the partitioning position having a horizontal position and a vertical position. Then, for each column of size m within k, 506–512 are performed. At 506, elements are sequentially read row-wise from the partitioning position for p rows, without reading any elements to the left of the horizontal position of the partitioning position, and the elements are sequentially written into the cache. At 508, elements are sequentially read column-wise from the partitioning position for p columns, without reading any elements above the vertical position of the partitioning position, and the elements are written row-wise from the partitioning position for p rows, without writing any elements to the left of the horizontal position of the partitioning position. At 510, elements are sequentially read from the cache and written row-wise back into the matrix column-wise for p columns, without writing any elements above the vertical position of the partitioning position. At 512, the partitioning position is moved p elements down and p elements to the right (which is also one column-block to the down and one-column block to the right, or one-column block further along the main diagonal).

At 514, the matrix is converted into an M×k matrix of vectors of length M. Finally, at 516, a permutation vector is applied to the converted matrix. The permutation vector contains two or more elements making up one or more permutation cycles. An index vector contains an element corresponding to each of the permutation cycles, each of the elements in the index vector indicating a starting position in the permutation vector for the corresponding permutation cycle. Each element within a permutation cycle corresponds to a block or element within the matrix, and the applying of the permutation vector includes moving the corresponding block or element for each element with in the permutation cycle to a location indicated by the previous element within the permutation cycle. The permutation vector may be determined by searching through a list of permutation vectors to find a permutation vector and accepting the permutation vector found for a matrix of size M×k or k×M. If no such vector is found, the permutation vector may simply be generated.

Figure 6:
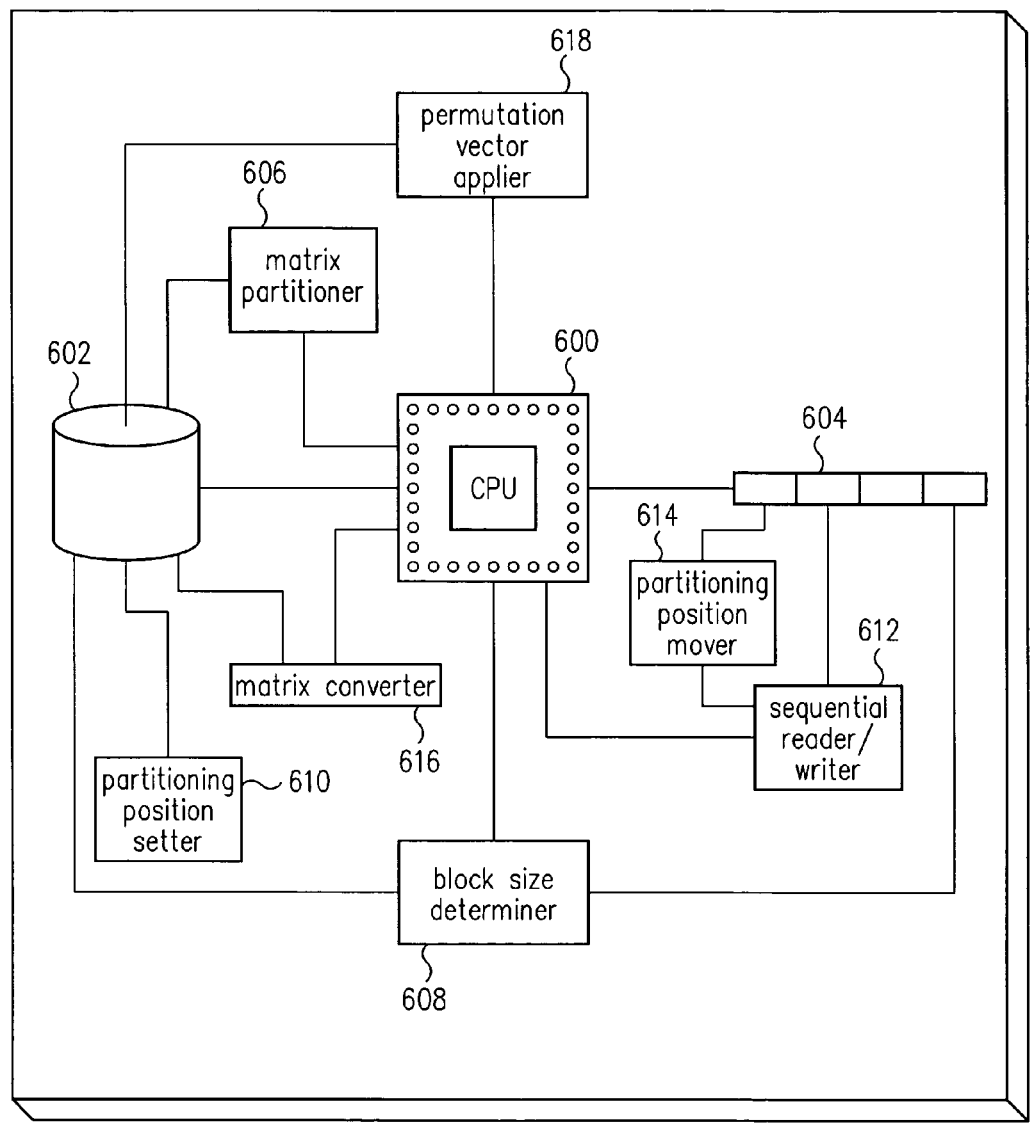
FIG. 6 is a block diagram illustrating a computer system for transposing a matrix of numbers, the matrix having M rows and k*M columns and a size M×kM in accordance with a specific embodiment of the present invention.

FIG. 6 is a block diagram illustrating a computer system for transposing a matrix of numbers, the matrix having M rows and k*M columns and a size M×kM in accordance with a specific embodiment of the present invention. A processor 600 is coupled to a memory 602. The matrix is stored in the memory 602. Additionally, a cache 604 is coupled to the processor 600. A matrix partitioner 606 coupled to the processor 600 and to the memory 602 partitions the matrix into k square matrices of size M×M. A block size determiner 608 coupled to the processor 600, the memory 602, and the cache 604 determines m and p, wherein M=m*p and wherein M×p represents a block size and wherein M is evenly divisible by p. In one embodiment of the present invention, the block size may be chosen such that it is the largest size that fits into the cache while still fulfilling the other parameters listed above. However, it is possible to alter the way the block size is chosen for particular types of matrices should experiments find that another method is optimal in the system.

Then, for each of the k square matrices, elements 610–614 perform several tasks. A partitioning position setter 610 coupled to the memory 604 sets a partitioning position at the upper left-corner element of the matrix, the partitioning position having a horizontal position and a vertical position. Then, for each column of size m within k, elements 612 and 614 perform several tasks. A sequential reader/writer 612 coupled to the cache 604 and the processor 600 sequentially reads elements row-wise from the partitioning position for p rows, without reading any elements to the left of the horizontal position of the partitioning position, and sequentially writes the elements into the cache. The sequential reader/writer 612 then sequentially reads elements column-wise from the partitioning position for p columns, without reading any elements above the vertical position of the partitioning position, and writes the elements row-wise from the partitioning position for p rows, without writing any elements to the left of the horizontal position of the partitioning position. Then, the sequential reader/writer 612 sequentially reads elements from the cache and sequentially writes row-wise back into the matrix column-wise for p columns, without writing any elements above the vertical position of the partitioning position. Then, a partitioning position mover 614 coupled to the sequential reader/writer 612 and to the memory 602 moves the partitioning position p elements down and p elements to the right (which is also one column-block to the down and one-column block to the right, or one-column block further along the main diagonal).

A matrix converter 616 coupled to the processor 600 and the memory 602 then converts the matrix into an M×k matrix of vectors of length M. Finally, a permutation vector applier 618 coupled to the processor 600 and the memory 602 applies a permutation vector to the converted matrix. The permutation vector contains two or more elements making up one or more permutation cycles. An index vector contains an element corresponding to each of the permutation cycles, each of the elements in the index vector indicating a starting position in the permutation vector for the corresponding permutation cycle. Each element within a permutation cycle corresponds to a block or element within the matrix, and the applying of the permutation vector includes moving the corresponding block or element for each element with in the permutation cycle to a location indicated by the previous element within the permutation cycle. The permutation vector may be determined by searching through a list of permutation vectors to find a permutation vector and accepting the permutation vector found for a matrix of size M×k or k×M. If no such vector is found, the permutation vector may simply be generated.

Though a kN×N rectangular matrix cannot be divided into contiguous square matrices, it can still take the benefit of square transpose and long length vector permutation transpose by swapping the two steps executed on the M×kM matrix above.

A matrix with kN rows and N columns, $A_{kN \times N}$, is divided into k square matrices of size N×N. In the first step, the original matrix is treated as a k×N matrix of vectors of length N, and is transposed by permutation transpose with permutation vector $V_{k,N}$. In step 2, the result matrix of step 1 is treated as an N×kN matrix and partitioned into k contiguous square matrices. Each of the k square matrices is transposed using the square transpose algorithm to get the final result. Example is again used to show the processing:

$$A = \begin{bmatrix} 0 & 6 \\ 1 & 7 \\ 2 & 8 \\ 3 & 9 \\ 4 & 10 \\ 5 & 11 \end{bmatrix} \xrightarrow{\text{partition}} \begin{bmatrix} \begin{bmatrix} 0 & 6 \\ 1 & 7 \end{bmatrix} \\ \begin{bmatrix} 2 & 8 \\ 3 & 9 \end{bmatrix} \\ \begin{bmatrix} 4 & 10 \\ 5 & 11 \end{bmatrix} \end{bmatrix} \xrightarrow{\text{treated as}}$$

$$\begin{bmatrix} \begin{pmatrix} 0 \\ 1 \end{pmatrix} & \begin{pmatrix} 6 \\ 7 \end{pmatrix} \\ \begin{pmatrix} 2 \\ 3 \end{pmatrix} & \begin{pmatrix} 8 \\ 9 \end{pmatrix} \\ \begin{pmatrix} 4 \\ 5 \end{pmatrix} & \begin{pmatrix} 10 \\ 11 \end{pmatrix} \end{bmatrix} \xrightarrow[\text{transpose}]{\text{permutation}} \begin{bmatrix} \begin{pmatrix} 0 \\ 1 \end{pmatrix} & \begin{pmatrix} 2 \\ 3 \end{pmatrix} & \begin{pmatrix} 4 \\ 5 \end{pmatrix} \\ \begin{pmatrix} 6 \\ 7 \end{pmatrix} & \begin{pmatrix} 8 \\ 9 \end{pmatrix} & \begin{pmatrix} 10 \\ 11 \end{pmatrix} \end{bmatrix} \xrightarrow{\text{treated as}}$$

$$\begin{bmatrix} \begin{bmatrix} 0 & 6 \\ 1 & 7 \end{bmatrix} & \begin{bmatrix} 2 & 8 \\ 3 & 9 \end{bmatrix} & \begin{bmatrix} 4 & 10 \\ 5 & 11 \end{bmatrix} \end{bmatrix} \xrightarrow[\text{transpose}]{\text{first square}}$$

$$\begin{bmatrix} \begin{bmatrix} 0 & \underline{1} \\ \underline{6} & 7 \end{bmatrix} & \begin{bmatrix} 2 & 8 \\ 3 & 9 \end{bmatrix} & \begin{bmatrix} 4 & 10 \\ 5 & 11 \end{bmatrix} \end{bmatrix} \xrightarrow[\text{transpose}]{\text{second square}}$$

$$\begin{bmatrix} \begin{bmatrix} 0 & 1 \\ 6 & 7 \end{bmatrix} & \begin{bmatrix} 2 & \underline{3} \\ \underline{8} & 9 \end{bmatrix} & \begin{bmatrix} 4 & 10 \\ 5 & 11 \end{bmatrix} \end{bmatrix} \xrightarrow[\text{transpose}]{\text{third square}}$$

$$\begin{bmatrix} \begin{bmatrix} 0 & 1 \\ 6 & 7 \end{bmatrix} & \begin{bmatrix} 2 & 8 \\ 3 & 9 \end{bmatrix} & \begin{bmatrix} 4 & \underline{5} \\ \underline{10} & 11 \end{bmatrix} \end{bmatrix}$$

$$= \begin{bmatrix} 0 & 1 & 2 & 3 & 4 & 5 \\ 6 & 7 & 8 & 9 & 10 & 11 \end{bmatrix}$$

$$= A^T$$

where the permutation vector used in step 1 is:

$V_{3,2} = (3\ 4\ 2\ 1)$

Figure 7:
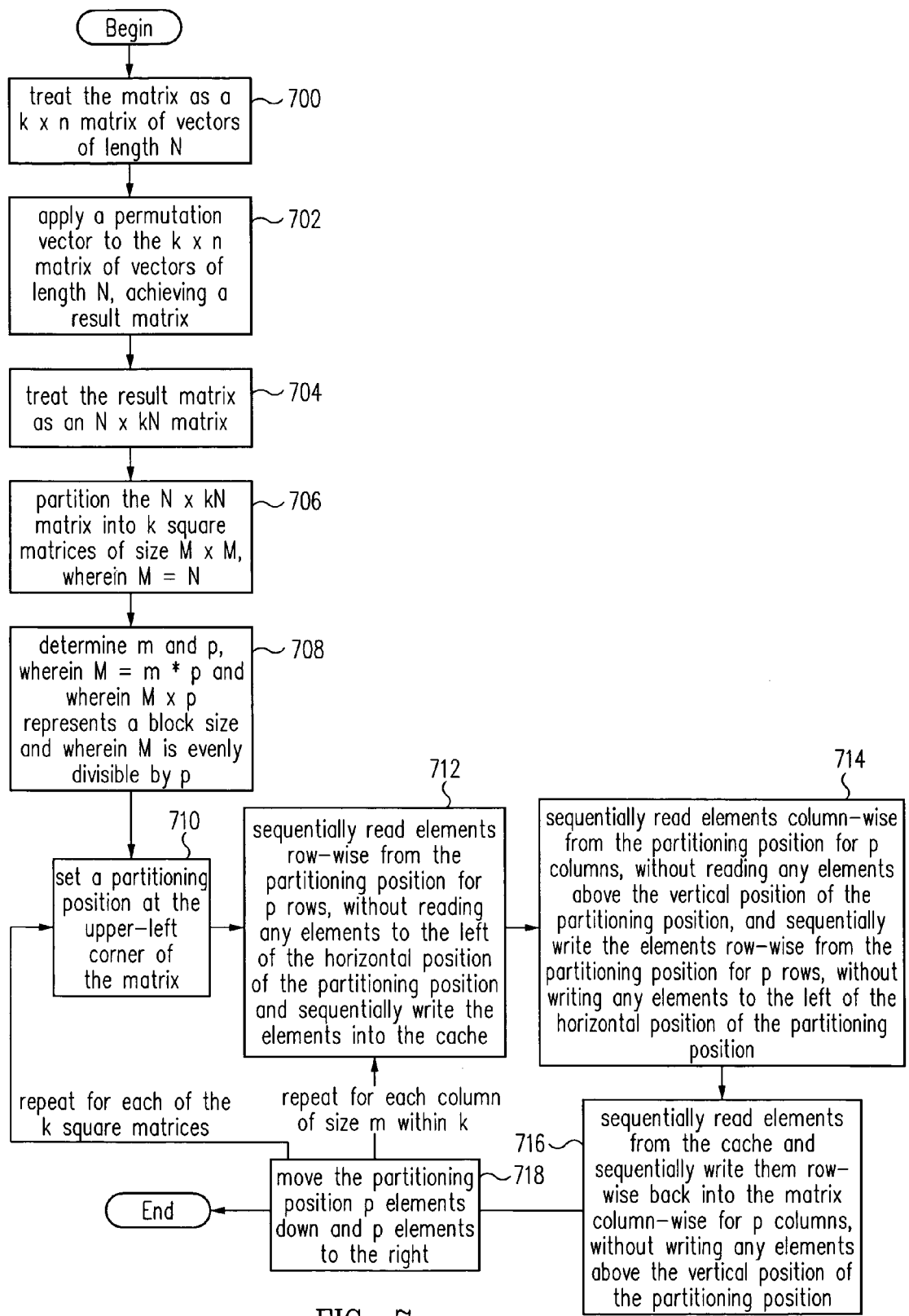
FIG. 7 is a flow diagram illustrating a method for transposing a matrix of numbers using a computer system, the computer system having a processor, a memory, and a cache, the matrix stored in the memory and having k*N rows and N columns and a size kN×N in accordance with a specific embodiment of the present invention.

FIG. 7 is a flow diagram illustrating a method for transposing a matrix of numbers using a computer system, the computer system having a processor, a memory, and a cache, the matrix stored in the memory and having k*N rows and N columns and a size kN×N in accordance with a specific embodiment of the present invention. At 700, the matrix is treated as a k×n matrix of vectors of length N. At 702, a permutation vector is applied to the k×n matrix of vectors of length N, achieving a result matrix. The permutation vector contains two or more elements making up one or more permutation cycles. An index vector contains an element corresponding to each of the permutation cycles, each of the elements in the index vector indicating a starting position in the permutation vector for the corresponding permutation cycle. Each element within a permutation cycle corresponds to a block or element within the matrix, and the applying of the permutation vector includes moving the corresponding block or element for each element with in the permutation cycle to a location indicated by the previous element within the permutation cycle. The permutation vector may be determined by searching through a list of permutation vectors to find a permutation vector and accepting the first permutation vector found for a matrix of size k×n or n×k. If no such vector is found, the permutation vector may simply be generated.

At 704, the result matrix is treated as an N×kN matrix. At 706, this N×kN matrix is then partitioned into k square matrices of size M×M, wherein M=N. At 708, m and p are determined, wherein M=m*p, and wherein M×p represents a block size and wherein M is evenly divisible by p. In one embodiment of the present invention, the block size may be chosen such that it is the largest size that fits into the cache while still fulfilling the other parameters listed above. However, it is possible to alter the way the block size is chosen for particular types of matrices should experiments find that another method is optimal in the system.

Then, for each of the k square matrices, 710–718 are performed. At 710, a partitioning position is set at the upper left-corner element of the matrix, the partitioning position having a horizontal position and a vertical position. Then, for each column of size m within k, 712–718 are performed. At 712, elements are sequentially read row-wise from the partitioning position for p rows, without reading any elements to the left of the horizontal position of the partitioning position, and the elements are sequentially written into the cache. At 714, elements are sequentially read column-wise from the partitioning position for p columns, without reading any elements above the vertical position of the partitioning position, and the elements are written row-wise from the partitioning position for p rows, without writing any elements to the left of the horizontal position of the partitioning position. At 716, elements are sequentially read from the cache and written row-wise back into the matrix column-wise for p columns, without writing any elements above the vertical position of the partitioning position. At 718, the partitioning position is moved p elements down and p elements to the right (which is also one column-block to the down and one-column block to the right, or one-column block further along the main diagonal).

Figure 8:
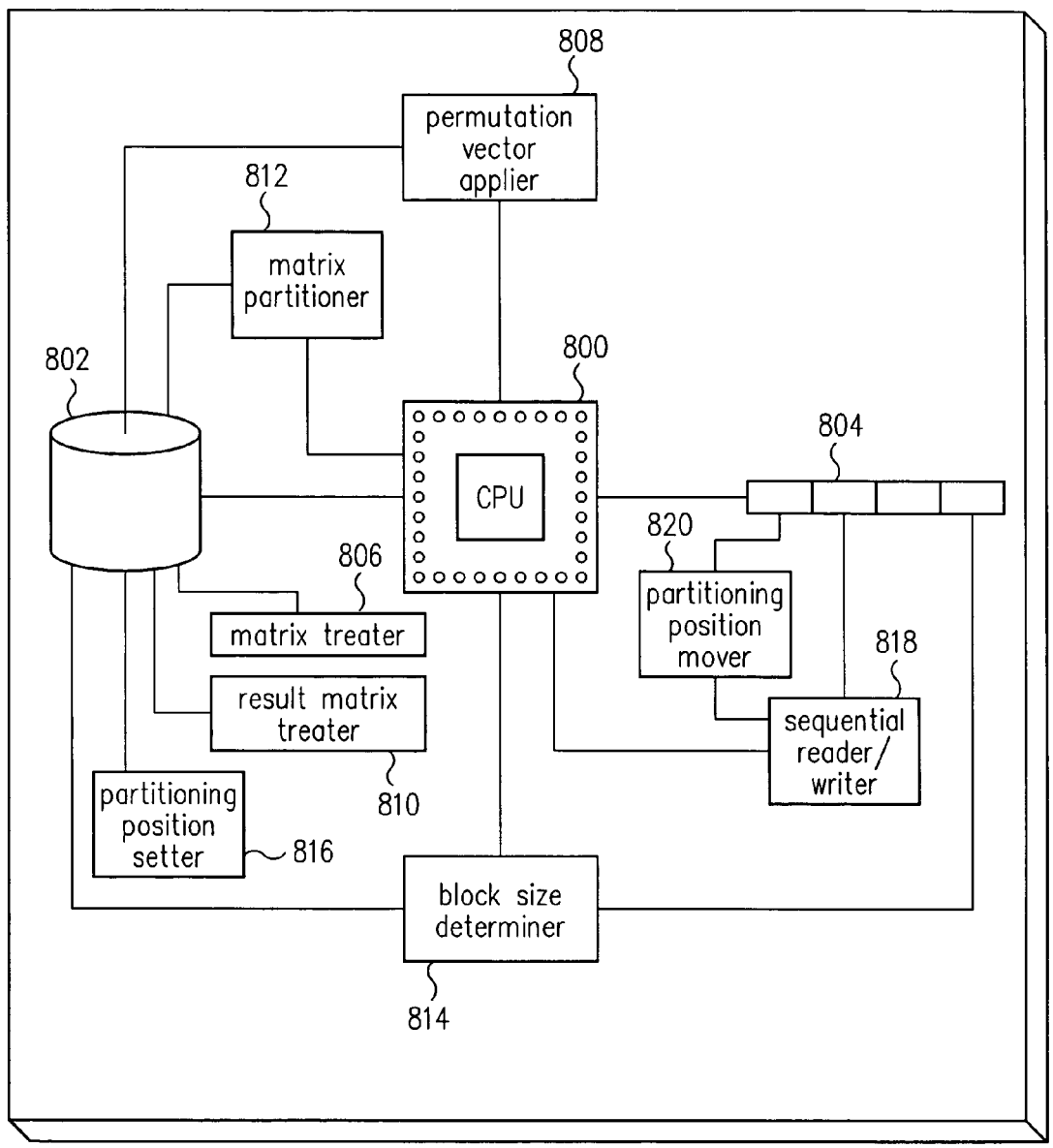
FIG. 8 is a block diagram illustrating a computer system for transposing a matrix of numbers, the matrix having k*N rows and N columns and a size kN×N in accordance with a specific embodiment of the present invention.

FIG. 8 is a block diagram illustrating a computer system for transposing a matrix of numbers, the matrix having k*N rows and N columns and a size kn×N in accordance with a specific embodiment of the present invention. A processor 800 is coupled to a memory 802. The matrix is stored in the memory 802. Additionally, a cache 804 is coupled to the processor 800. A matrix treater 806 coupled to the memory 802 treats the matrix as a k×n matrix of vectors of length N. A permutation vector applier 808 coupled to the processor 800 and to the memory 802 applies a permutation vector to the k×n matrix of vectors of length N, achieving a result matrix. The permutation vector contains two or more elements making up one or more permutation cycles. An index vector contains an element corresponding to each of the permutation cycles, each of the elements in the index vector indicating a starting position in the permutation vector for the corresponding permutation cycle. Each element within a permutation cycle corresponds to a block or element within the matrix, and the applying of the permutation vector includes moving the corresponding block or element for each element with in the permutation cycle to a location indicated by the previous element within the permutation cycle. The permutation vector may be determined by searching through a list of permutation vectors to find a permutation vector and accepting the permutation vector found for a matrix of size k×n or n×k. If no such vector is found, the permutation vector may simply be generated.

A result matrix treater 810 coupled to the memory 802 treats the result matrix as an N×kN matrix. A matrix partitioner 812 coupled to the memory then partitions this N×kN matrix into k square matrices of size M×M, wherein M=N. A block size determiner 814 coupled to the processor 800, the memory 802, and the cache 804 then determines m and p, wherein M=m*p, and wherein M×p represents a block size and wherein M is evenly divisible by p. In one embodiment of the present invention, the block size may be chosen such that it is the largest size that fits into the cache while still fulfilling the other parameters listed above. However, it is possible to alter the way the block size is chosen for particular types of matrices should experiments find that another method is optimal in the system.

Then, for each of the k square matrices, elements 816–820 perform several tasks. A partition position setter 816 coupled to the memory 802 sets a partitioning position at the upper left-corner element of the matrix, the partitioning position having a horizontal position and a vertical position. Then, for each column of size m within k, elements 818 and 820 perform several tasks. A sequential reader/writer 818 coupled to the cache 804 and to the processor 800 sequentially reads elements row-wise from the partitioning position for p rows, without reading any elements to the left of the horizontal position of the partitioning position, and sequentially writes the elements into the cache. The sequential reader/writer 818 then sequentially reads elements column-wise from the partitioning position for p columns, without reading any elements above the vertical position of the partitioning position, and sequentially writes the elements row-wise from the partitioning position for p rows, without writing any elements to the left of the horizontal position of the partitioning position. The sequential reader/writer 818 then sequentially reads elements from the cache and sequentially writes them row-wise back into the matrix column-wise for p columns, without writing any elements above the vertical position of the partitioning position. Finally, a partition position mover 820 coupled to the sequential reader/writer 818 and to the cache 804 moves the partitioning position p elements down and p elements to the right (which is also one column-block to the down and one-column block to the right, or one-column block further along the main diagonal).

If a rectangular matrix $A_{m \times n}$ cannot be classified into any of the above special cases, it may be partitioned into a k×k square matrix of blocks of size m×n, where M=k*m and N=k*n. Then a two-step process may be developed.

In step 1, each of the k×k blocks is transposed. Since the elements of the blocks are not stored contiguously, a simple permutation cannot be used to perform the transpose. A special copy transpose is used to transpose all the blocks in a column at once. Permutation will not be necessary for this case.

In step 2, the k×k block matrix is transposed by swapping the blocks about the main diagonal. For example, consider matrix $A_{6\times 4}$:

$$A = \begin{bmatrix} 0 & 6 & 12 & 18 \\ 1 & 7 & 13 & 19 \\ 2 & 8 & 14 & 20 \\ 3 & 9 & 15 & 21 \\ 4 & 10 & 16 & 22 \\ 5 & 11 & 17 & 23 \end{bmatrix} \stackrel{\text{partition}}{=} \begin{bmatrix} \begin{bmatrix} 0 & 6 \\ 1 & 7 \\ 2 & 8 \end{bmatrix} & \begin{bmatrix} 12 & 18 \\ 13 & 19 \\ 14 & 20 \end{bmatrix} \\ \begin{bmatrix} 3 & 9 \\ 4 & 10 \\ 5 & 11 \end{bmatrix} & \begin{bmatrix} 15 & 21 \\ 16 & 22 \\ 17 & 23 \end{bmatrix} \end{bmatrix}$$

For step 1, the first columns (first two blocks) are copied to workspace W sequentially:

$$W = \begin{bmatrix} 0 & 6 \\ 1 & 7 \\ 2 & 8 \\ 3 & 9 \\ 4 & 10 \\ 5 & 11 \end{bmatrix}$$

then copied back from W to A in the same spot in a transpose manner (the two blocks are transposed respectively):

$$A \xrightarrow[\text{transpose}]{\text{first copy}} \begin{bmatrix} \begin{bmatrix} 0 & 1 & 2 \\ 6 & 7 & 8 \end{bmatrix} & \begin{bmatrix} 12 & 18 \\ 13 & 19 \\ 14 & 20 \end{bmatrix} \\ \begin{bmatrix} 3 & 4 & 5 \\ 9 & 10 & 11 \end{bmatrix} & \begin{bmatrix} 15 & 21 \\ 16 & 22 \\ 17 & 23 \end{bmatrix} \end{bmatrix} = A_1$$

Repeat the copy transpose to the second column:

$$W = \begin{bmatrix} 12 & 18 \\ 13 & 19 \\ 14 & 20 \\ 15 & 21 \\ 16 & 22 \\ 17 & 23 \end{bmatrix}$$

$$A_1 \xrightarrow[\text{transpose}]{\text{second copy}} \begin{bmatrix} \begin{bmatrix} 0 & 1 & 2 \\ 6 & 7 & 8 \end{bmatrix} & \begin{bmatrix} 12 & 13 & 14 \\ 18 & 19 & 20 \end{bmatrix} \\ \begin{bmatrix} 3 & 4 & 5 \\ 9 & 10 & 11 \end{bmatrix} & \begin{bmatrix} 15 & 16 & 17 \\ 21 & 22 & 23 \end{bmatrix} \end{bmatrix} = A_2$$

For step 2, simply swapping the blocks in $A_1$ will give the final result:

$$A_2 \xrightarrow[\text{(swap)}]{\text{square transpose}} \begin{bmatrix} \begin{bmatrix} 0 & 1 & 2 \\ 6 & 7 & 8 \end{bmatrix} & \begin{bmatrix} 3 & 4 & 5 \\ 9 & 10 & 11 \end{bmatrix} \\ \begin{bmatrix} 12 & 13 & 14 \\ 18 & 19 & 20 \end{bmatrix} & \begin{bmatrix} 15 & 16 & 17 \\ 21 & 22 & 23 \end{bmatrix} \end{bmatrix}$$

$$= \begin{bmatrix} 0 & 1 & 2 & 3 & 4 & 5 \\ 6 & 7 & 8 & 9 & 10 & 11 \\ 12 & 13 & 14 & 15 & 16 & 17 \\ 18 & 19 & 20 & 21 & 22 & 23 \end{bmatrix}$$

$$= A^T$$

Figure 9:
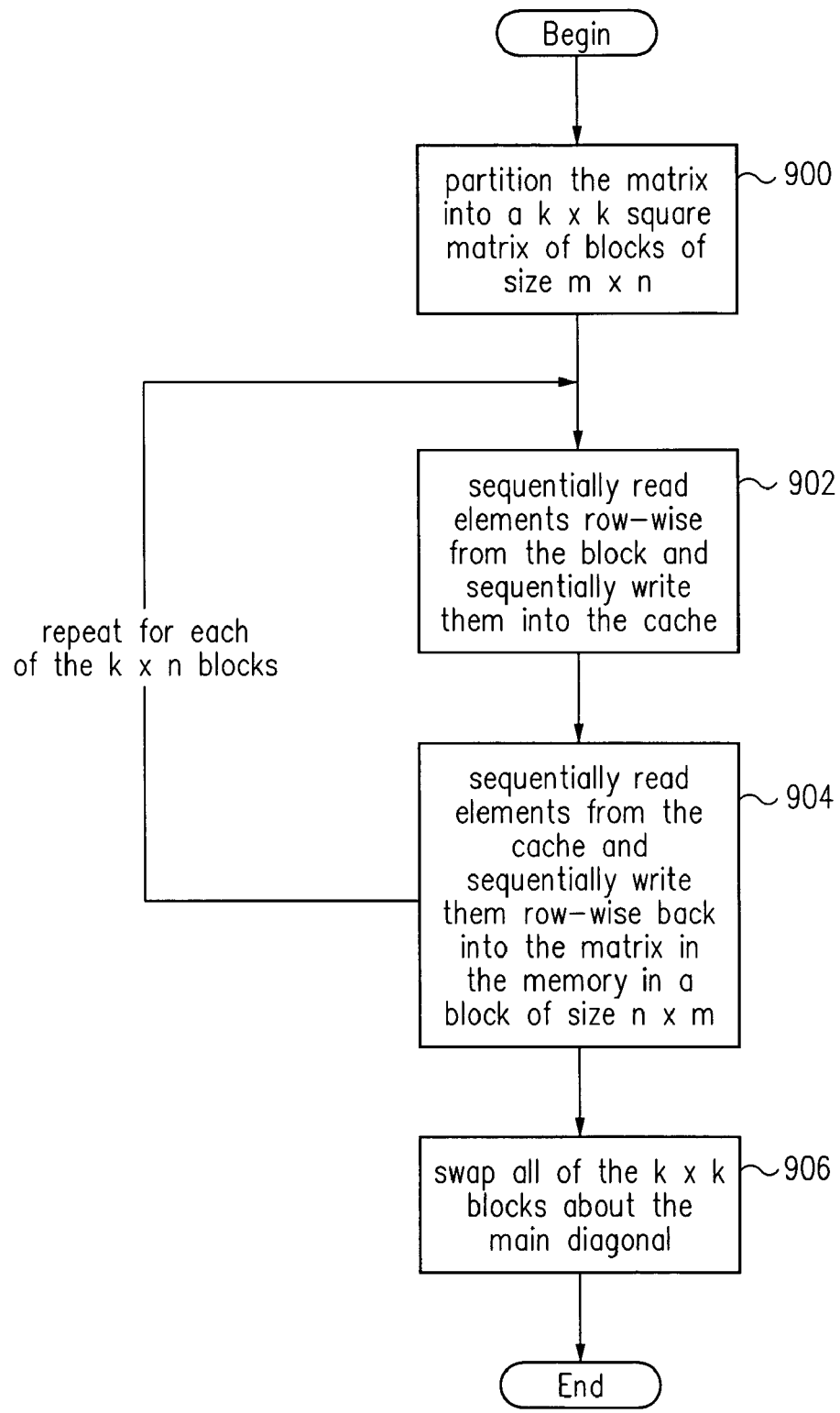
FIG. 9 is a flow diagram illustrating a method for transposing a matrix of numbers using a computer system, the computer system having a processor, a memory, and a cache, the matrix stored in the memory and having k*m rows and k*n columns and a size km×kn in accordance with a specific embodiment of the present invention.

FIG. 9 is a flow diagram illustrating a method for transposing a matrix of numbers using a computer system, the computer system having a processor, a memory, and a cache, the matrix stored in the memory and having k*m rows and k*n columns and a size km×kn in accordance with a specific embodiment of the present invention. At 900, the matrix is partitioned into a k×k square matrix of blocks of size m×n. Then, for each of the k×n blocks, 902 and 904 are performed. At 902, elements are sequentially read row-wise from the blocks and sequentially written into the cache. At 904, the elements are sequentially read from the cache and sequentially written row-wise back into the matrix in the memory in a block of size n×m. Finally, at 906, all of the k×k blocks are swapped about the main diagonal.

Figure 10:
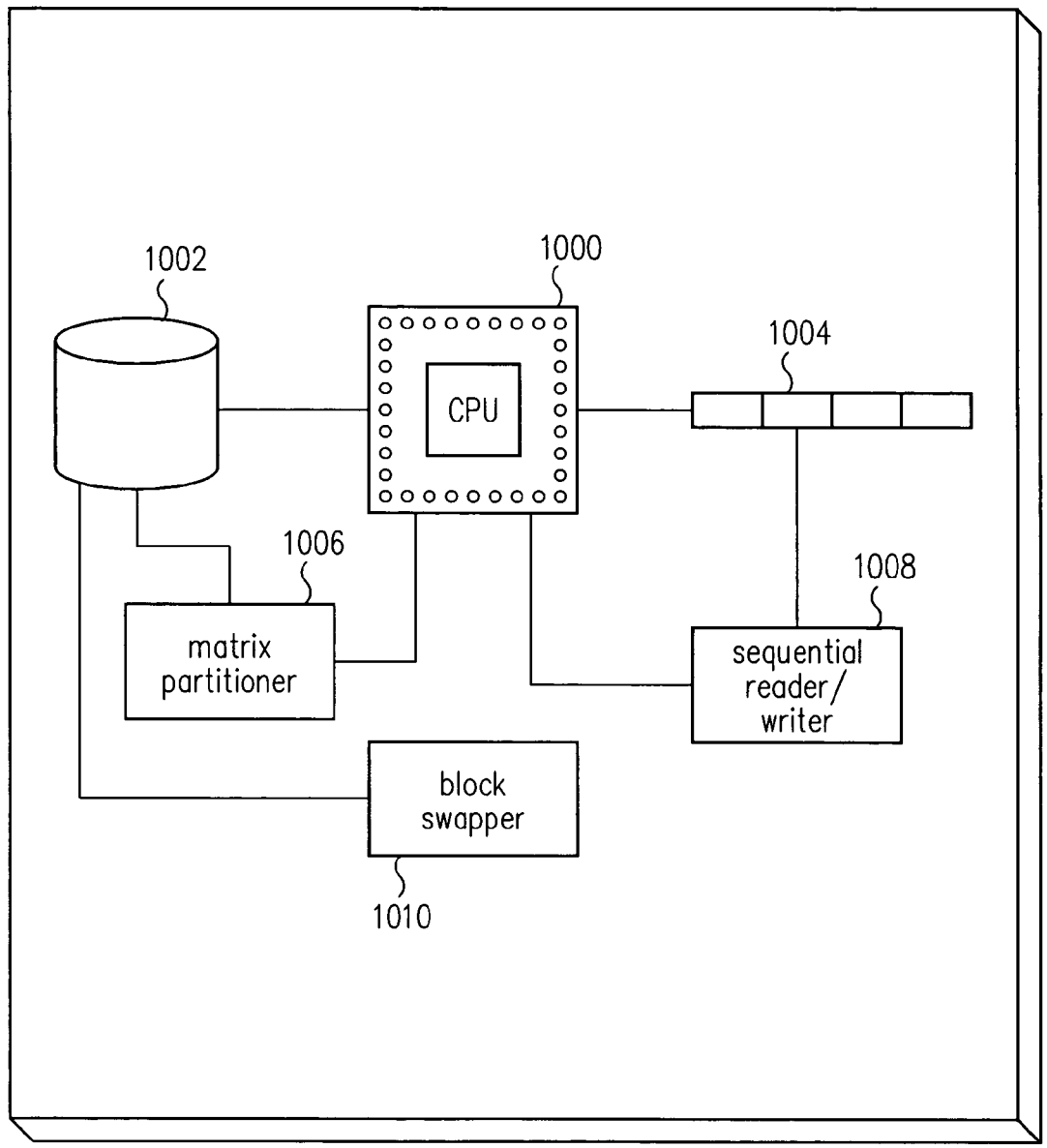
FIG. 10 is a block diagram illustrating a computer system for transposing a matrix of numbers, the matrix having k*m rows and k*n columns and a size km×kn in accordance with a specific embodiment of the present invention.

FIG. 10 is a block diagram illustrating a computer system for transposing a matrix of numbers, the matrix having k*m rows and k*n columns and a size km×kn in accordance with a specific embodiment of the present invention. A processor 1000 is coupled to a memory 1002. The matrix is stored in the memory 1002. Additionally, a cache 1004 is coupled to the processor 1000. A matrix partitioner 1006 coupled to the processor 1000 and to the memory 1002 partitions the matrix into a k×k square matrix of blocks of size m×n. Then, for each of the k×n blocks, a sequential reader/writer 1008 coupled to the coupled to the cache 1004 and to the processor 1000 performs several tasks. It sequentially reads elements row-wise from the blocks and sequentially writes them into the cache. Then, it sequentially reads the elements from the cache and sequentially writes them row-wise back into the matrix in the memory in a block of size n×m. Finally, a block swapper 1010 coupled to the memory 1004 swaps all of the k×k blocks are swapped about the main diagonal.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for transposing a matrix of numbers using a computer system, said computer system having a processor, a memory, and a cache, the matrix stored in the memory and having M rows and N columns and a size M×N, the method including:

determining n and q, wherein N=n*q, and wherein M×q represents a block size and wherein N is evenly divisible by q, partitioning said matrix into n columns of size M×q; for each column n:

sequentially reading elements within said column n row-wise and sequentially writing said elements into the cache; and sequentially reading elements from the cache and sequentially writing them row-wise back into the matrix in the memory in a column of size q×M; and applying a permutation vector to said matrix.

2. The method of claim 1, wherein said block size is the largest block size that fits into the cache wherein N is evenly divisible by q.

3. The method of claim 1, wherein said permutation vector contains two or more elements making up one or more permutation cycles and an index vector contains an element corresponding to each of said permutation cycles, each of said elements in said index vector indicating a starting position in said permutation vector for said corresponding permutation cycle.

4. The method of claim 3, wherein each element within a permutation cycle corresponds to a block or element within the matrix and said applying a permutation vector includes moving said corresponding block or element for each element within said permutation cycle to a location indicated by the previous element within said permutation cycle.

5. The method of claim 1, further including searching through a list of permutation vectors to find a permutation vector and accepting the permutation vector found for a matrix of size M×N or N×M.

6. The method of claim 5, further including generating a permutation vector, for said matrix and saving it in said list if no acceptable matrix is found in said searching.

7. A method for transposing a square matrix of numbers using a computer system, said computer system having a processor, a memory, and a cache, the matrix stored in the memory and having M rows and M columns and a size M×M, the method including:

determining in and p, wherein M=M*p, and wherein M×p represents a block size and wherein M is evenly divisible by p;

setting a partitioning position at the upper-left corner element of the matrix, said partitioning position having a horizontal position and a vertical position;

for each column of size p:

sequentially reading elements row-wise from said partitioning position for p rows, without reading any elements to the left of said horizontal position of said partitioning position, and sequentially writing said elements into the cache;

sequentially reading elements column-wise from said partitioning position for p columns, without reading any elements above said vertical position of said partitioning position, and sequentially writing said elements row-wise from said partitioning position for p rows, without writing any elements to the left of said horizontal position of said partitioning position;

sequentially reading elements from the cache and sequentially writing them row-wise back into the matrix column-wise for p columns, without writing any elements above said vertical position of said partitioning position; and moving said partitioning position p elements down and p elements to the right.

8. The method of claim 7, wherein said block size is the largest block size that fits into the cache wherein M is evenly divisible by p.

9. A method for transposing a matrix of numbers using a computer system, said computer system having a processor, a memory, and a cache, the matrix stored in the memory and having M rows and k*M columns and a size M×kM, the method including:

partitioning said matrix into k square matrices of size M×M;

determining m and p, wherein M=m*p, and wherein M×p represents a block size and wherein M is evenly divisible by p;

for each of said k square matrices:

setting a partitioning position at the upper-left corner element of the matrix, said partitioning position having a horizontal position and a vertical position;

for each column of size m:

sequentially reading elements row-wise from said partitioning position for p rows, without reading any elements to the left of said horizontal position of said partitioning position, and sequentially writing said elements into the cache;

sequentially reading elements column-wise from said partitioning position for p columns, without reading any elements above said vertical position of said partitioning position, and sequentially writing said elements row-wise from said partitioning position for p rows, without writing any elements to the left of said horizontal position of said partitioning position;

sequentially reading elements from the cache and sequentially writing them row-wise back into the matrix column-wise for p columns, without writing any elements above said vertical position of said partitioning position; and moving said partitioning position p elements down and p elements to the right;

converting the matrix into an M×k matrix of vectors of length M; and applying a permutation vector to said converted matrix.

10. The method of claim 9, wherein said block size is the largest block size that fits into the cache wherein M is evenly divisible by p.

11. The method of claim 9, wherein said permutation vector contains two or more elements making up one or more permutation cycles and an index vector contains an element corresponding to each of said permutation cycles, each of said elements in said index vector indicating a starting position in said permutation vector for said corresponding permutation cycle.

12. The method of claim 11, wherein each element within a permutation cycle corresponds to a block or element within the matrix and said applying a permutation vector includes moving said corresponding block or element for each element within said permutation cycle to a location indicated by the previous element within said permutation cycle.

13. The method of claim 9, further including searching through a list of permutation vectors to find a permutation vector and accepting the permutation vector found for a matrix of size M×kM or kM×M.

14. The method of claim 13, further including generating a permutation vector for said matrix and saving it in said list if no acceptable matrix is found in said searching.

15. A method for transposing a matrix of numbers using a computer system, said computer system having a processor, a memory, and a cache, the matrix stored in the memory and having k*N rows and N columns and a size kN×N, the method including:

treating the matrix as a k×n matrix of vectors of length N;

applying a permutation vector to said k×n matrix of vectors of length N, achieving a result matrix;

treating said result matrix of said applying as an N×kN matrix;

partitioning said N×kN matrix into k contiguous square matrices;

partitioning said matrix into k square matrices of size M×M, wherein M=N;

determining m and p, wherein M=m*p, and wherein M×p represents a block size and wherein M is evenly divisible by p;

for each of said k contiguous square matrices:

setting a partitioning position at the upper-left corner element of the matrix, said partitioning position having a horizontal position and a vertical position;

for each column of size m:

sequentially reading elements row-wise from said partitioning position for p rows, without reading any elements to the left of said horizontal position of said partitioning position, and sequentially writing said elements into the cache;

sequentially reading elements column-wise from said partitioning position for p columns, without reading any elements above said vertical position of said partitioning position, and sequentially writing said elements row-wise from said partitioning position for p rows, without writing any elements to the left of said horizontal position of said partitioning position;

sequentially reading elements from the cache and sequentially writing them row-wise back into the matrix column-wise for p columns, without writing any elements above said vertical position of said partitioning position; and moving said partitioning position p elements down and p elements to the right.

16. The method of claim 15, wherein said block size is the largest block size that fits into the cache wherein M is evenly divisible by p.

17. A method for transposing a matrix of numbers using a computer system, said computer system having a processor, a memory, and a cache, the matrix stored in the memory and having k*m rows and k*n columns and a size km×kn, the method including:

partitioning the matrix into a k×k square matrix of blocks of size m×n;

for each of said k×k blocks:

sequentially reading elements within said blocks row-wise and sequentially writing said elements into the cache;

sequentially reading elements from the cache and sequentially writing them row-wise back into the matrix in the memory in a block of size n×m; and swapping all of said k×k blocks about the main diagonal.

18. A computer system for transposing a matrix of numbers, the matrix having M rows and N columns and a size M×N, the system including:

a processor;

a memory coupled to the processor, the matrix stored in the memory;

a cache coupled to the processor;

a block size determiner coupled to the processor, the memory, and the cache;

a matrix partitioner coupled to the processor and to the memory;

a sequential reader/writer coupled to the cache and to the processor; and a permutation vector applier coupled to the processor and to the memory.

19. A computer system for transposing a matrix of numbers, the matrix having M rows and M columns and a size M×M, the system including:

a processor;

a memory coupled to the processor;

a cache coupled to the processor;

a block size determiner coupled to the processor, the memory, and the cache;

a partitioning position setter coupled to the memory;

a sequential reader/writer coupled to the cache and the processor; and a partitioning position mover coupled to the sequential reader/writer and to the cache.

20. A computer system for transposing a matrix of numbers, the matrix having M rows and k*M columns and a size M×kM, the system including:

a processor;

a memory coupled to the processor;

a cache coupled to the processor;

a matrix partitioner coupled to the processor and to the memory;

a block size determiner coupled to the processor, the memory, and the cache;

a partitioning position setter coupled to the memory;

a sequential reader/writer coupled to the cache and the processor; and a partitioning position mover coupled to the sequential reader/writer.

21. A computer system for transposing a matrix of numbers, the matrix having k*N rows and N columns and a size kN×N, the system including:

a processor;

a memory coupled to the processor;

a cache coupled to the processor;

a matrix treater coupled to the memory;

a permutation vector applier coupled to the processor;

a result matrix treater coupled to the memory;

a matrix partitioner coupled to the memory;

a block size determiner coupled to the processor, the memory, and the cache;

a partition position setter coupled to the memory;

a sequential reader/writer coupled to the cache and to the processor; and a partition position mover coupled to the sequential reader/writer and to the cache.

22. A computer system for transposing a matrix of numbers, the matrix having M rows and M columns and a size M×M, the system including:

a processor;

a memory coupled to the processor;

a cache coupled to the processor;

a matrix partitioner coupled to the processor;

a sequential reader/writer coupled to the cache and to the processor; and a block swapper coupled to the memory.

23. An apparatus for transposing a matrix of numbers using a computer system, said computer system having a processor, a memory, and a cache, the matrix stored in the memory and having M rows and N columns and a size M×N, the apparatus including:

means for determining n and q, wherein N=n*q, and wherein M×q represents a block size and wherein N is evenly divisible by q;

means for partitioning said matrix into n columns of size M×q;

for each column n:

means for sequentially reading elements within said column n row-wise and sequentially writing said elements into the cache; and means for sequentially reading elements from the cache and sequentially writing them row-wise back into the matrix in the memory in a column of size q×M; and means for applying a permutation vector to said matrix.

24. The apparatus of claim 23, wherein said block size is the largest block size that fits into the cache wherein N is evenly divisible by q.

25. The apparatus of claim 23, wherein said permutation vector contains two or more elements making up one or more permutation cycles and an index vector contains an element corresponding to each of said permutation cycles, each of said elements in said index vector indicating a starting position in said permutation vector for said corresponding permutation cycle.

26. The apparatus of claim 25, wherein each element within a permutation cycle corresponds to a block or element within the matrix and said means for applying a permutation vector includes means for moving said corresponding block or element for each element within said permutation cycle to a location indicated by the previous element within said permutation cycle.

27. The apparatus of claim 23, further including means for searching through a list of permutation vectors to find a permutation vector and accepting the permutation vector found for a matrix of size M×N or N×M.

28. The apparatus of claim 27, further including means for generating a permutation vector for said matrix and saving it in said list if no acceptable matrix is found in said searching.

29. An apparatus for transposing a square matrix of numbers using a computer system, said computer system having a processor, a memory, and a cache, the matrix stored in the memory and having M rows and M columns and a size M×M, the apparatus including:

means for determining m and p, wherein M=m*p, and wherein M×p represents a block size and wherein M is evenly divisible by p;

means for setting a partitioning position at the upper-left corner element of the matrix, said partitioning position having a horizontal position and a vertical position;

for each column of size p:

means for sequentially reading elements row-wise from said partitioning position for p rows, without reading any elements to the left of said horizontal position of said partitioning position, and sequentially writing said elements into the cache;

means for sequentially reading elements column-wise from said partitioning position for p columns, without reading any elements above said vertical position of said partitioning position, and sequentially writing said elements row-wise from said partitioning position for p rows, without writing any elements to the left of said horizontal position of said partitioning position;

means for sequentially reading elements from the cache and sequentially writing them row-wise back into the matrix column-wise for p columns, without writing any elements above said vertical position of said partitioning position; and means for moving said partitioning position p elements down and p elements to the right.

30. The apparatus of claim 29, wherein said block size is the largest block size that fits into the cache wherein M is evenly divisible by p.

31. An apparatus for transposing a matrix of numbers using a computer system, said computer system having a processor, a memory, and a cache, the matrix stored in the memory and having M rows and k*M columns and a size M×kM, the apparatus including:

means for partitioning said matrix into k square matrices of size M×M;

means for determining m and p, wherein M=m*p, and wherein M×p represents a block size and wherein M is evenly divisible by p;

for each of said k square matrices:

means for setting a partitioning position at the upper-left corner element of the matrix, said partitioning position having a horizontal position and a vertical position;

for each column of size m:

means for sequentially reading elements row-wise from said partitioning position for p rows, without reading any elements to the left of said horizontal position of said partitioning position, and sequentially writing said elements into the cache;

means for sequentially reading elements column-wise from said partitioning position for p columns, without reading any elements above said vertical position of said partitioning position, and sequentially writing said elements row-wise from said partitioning position for p rows, without writing any elements to the left of said horizontal position of said partitioning position;

means for sequentially reading elements from the cache and sequentially writing them row-wise back into the matrix column-wise for p columns, without writing any elements above said vertical position of said partitioning position; and means for moving said partitioning position p elements down and p elements to the right;

means for convening the matrix into an M×k matrix of vectors of length M; and means for applying a permutation vector to said converted matrix.

32. The apparatus of claim 31, wherein said block size is the largest block size that fits into the cache wherein M is evenly divisible by p.

33. The apparatus of claim 31, wherein said permutation vector contains two or more elements making up one or more permutation cycles and an index vector contains an element corresponding to each of said permutation cycles, each of said elements in said index vector indicating a starting position in said permutation vector for said corresponding permutation cycle.

34. The apparatus of claim 33, wherein each element within a permutation cycle corresponds to a block or element within the matrix and said means for applying a permutation vector includes means for moving said corresponding block or element for each element within said permutation cycle to a location indicated by the previous element within said permutation cycle.

35. The apparatus of claim 31, further including means for searching through a list of permutation vectors to find a permutation vector and accepting the first permutation vector found for a matrix of size M×kM or kM×M.

36. The method of claim 35, further including means for generating a permutation vector for said matrix and saving it in said list if no acceptable matrix is found in said searching.

37. An apparatus for transposing a matrix of numbers using a computer system, said computer system having a processor, a memory, and a cache, the matrix stored in the memory and having k*N rows and N columns and a size kN×N, the apparatus including:

means for treating the matrix as a k×n matrix of vectors of length N;

means for applying a permutation vector to said k×n matrix of vectors of length N, achieving a result matrix;

means for treating said result matrix of said applying as an N×kN matrix;

means for partitioning said N×kN matrix into k contiguous square matrices;

means for partitioning said matrix into k square matrices of size M×M, wherein M=N;

means for determining m and p, wherein M=m*p, and wherein M×p represents a block size and wherein M is evenly divisible by p;

for each of said k contiguous square matrices:

means for setting a partitioning position at the upper-left corner element of the matrix, said partitioning position having a horizontal position and a vertical position;

for each column of size m:

means for sequentially reading elements row-wise from said partitioning position for p rows, without reading any elements to the left of said horizontal position of said partitioning position, and sequentially writing said elements into the cache;

means for sequentially reading elements column-wise from said partitioning position for p columns, without reading any elements above said vertical position of said partitioning position, and sequentially writing said elements row-wise from said partitioning position for p rows, without writing any elements to the left of said horizontal position of said partitioning position;

means for sequentially reading elements from the cache and sequentially writing them row-wise back into the matrix column-wise for p columns, without writing any elements above said vertical position of said partitioning position; and means for moving said partitioning position p elements down and p elements to the right.

38. The apparatus of claim 37, wherein said block size is the largest block size that fits into the cache wherein M is evenly divisible by p.

39. A apparatus for transposing a matrix of numbers using a computer system, said computer system having a processor, a memory, and a cache, the matrix stored in the memory and having k*m rows and k*n columns and a size km×kn, the apparatus including: means for partitioning the matrix into a k×k square matrix of blocks of size m×n;

for each of said k×k blocks:

means for sequentially reading elements within said blocks row-wise and sequentially writing said elements into the cache;

means for sequentially reading elements from the cache and sequentially writing them row-wise back into the matrix in the memory in a block of size n×m; and means for swapping all of said k×k blocks about the main diagonal.

* * * * *